(12) United States Patent
Altberg et al.

(10) Patent No.: US 9,984,377 B2
(45) Date of Patent: *May 29, 2018

(54) SYSTEM AND METHOD FOR PROVIDING ADVERTISEMENT

(75) Inventors: Ebbe Altberg, Mill Valley, CA (US);
Scott Faber, San Francisco, CA (US);
Ron Hirson, San Francisco, CA (US);
Sean Van Der Linden, Berkeley, CA (US); Ben Harris Lyon, San Francisco, CA (US); Paul G. Manca, Oakland, CA (US)

(73) Assignee: YELLOWPAGES.COM LLC, DFW Airport, TX (US)

( * ) Notice: Subject to any disclaimer, the term of this patent is extended or adjusted under 35 U.S.C. 154(b) by 1992 days.

This patent is subject to a terminal disclaimer.

(21) Appl. No.: 11/624,631

(22) Filed: Jan. 18, 2007

(65) Prior Publication Data

US 2007/0130014 A1 Jun. 7, 2007

Related U.S. Application Data

(60) Provisional application No. 60/818,136, filed on Jun. 30, 2006.

(51) Int. Cl.
*G06Q 30/00* (2012.01)
*G06Q 30/02* (2012.01)
(Continued)

(52) U.S. Cl.
CPC .......... *G06Q 30/02* (2013.01); *G06Q 10/10* (2013.01); *G06Q 30/0273* (2013.01);
(Continued)

(58) Field of Classification Search
CPC .......... G06Q 30/0273; G06Q 30/0276; G06Q 10/10; G06Q 30/02; G10L 13/00; H04N 21/64707
(Continued)

(56) References Cited

U.S. PATENT DOCUMENTS

| 4,313,035 A | 1/1982 | Jordan et al. |
| 4,577,065 A | 3/1986 | Frey et al. |

(Continued)

FOREIGN PATENT DOCUMENTS

| AU | 699785 | 5/1995 |
| AU | 2004202940 A1 | 4/2005 |

(Continued)

OTHER PUBLICATIONS

International Application No. PCT/US07/72279, Written Opinion and International Search Report, dated Mar. 12, 2008.

(Continued)

*Primary Examiner* — Raquel Alvarez
(74) *Attorney, Agent, or Firm* — Mark E. Stallion; Greensfelder, Hemker & Gale, P.C.

(57) ABSTRACT

A method and system of advertising. In response to a request received from an advertiser, an audio advertisement is generated based on visual advertisement information. The audio advertisement is provided for presentation on behalf of the advertiser. In one embodiment, the audio advertisement is an abbreviated form of the visual advertisement information. A determination is made as to whether a call from a customer has been connected to the advertiser via the audio advertisement. The advertiser is charged a predefined fee if it is determined that a call from a customer has been connected to the advertiser via the audio advertisement. In one embodiment, a text for a first advertisement presentable in a first media type is received to generate an abbreviated text for a second advertisement presentable in a second media type.

12 Claims, 21 Drawing Sheets

(51) Int. Cl.
*H04N 21/647* (2011.01)
*G06Q 10/10* (2012.01)
*G10L 13/00* (2006.01)

(52) U.S. Cl.
CPC .......... *G06Q 30/0276* (2013.01); *G10L 13/00* (2013.01); *H04N 21/64707* (2013.01)

(58) Field of Classification Search
USPC .................. 705/14.69, 14.72; 709/207, 218; 379/112.01, 114.01, 114.05, 114.13; 704/260
See application file for complete search history.

(56) References Cited

U.S. PATENT DOCUMENTS

| | | |
|---|---|---|
| 4,631,428 A | 12/1986 | Grimes |
| 4,645,873 A | 2/1987 | Chomet |
| 4,653,090 A | 3/1987 | Hayden |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,788,718 A | 11/1988 | McNabb et al. |
| 4,847,890 A | 7/1989 | Solomon et al. |
| 4,850,007 A | 7/1989 | Marino et al. |
| 4,963,995 A | 10/1990 | Lang |
| 5,057,932 A | 10/1991 | Lang |
| 5,058,152 A | 10/1991 | Solomom et al. |
| 5,148,474 A | 9/1992 | Haralambopoulos et al. |
| 5,155,743 A | 10/1992 | Jacobs |
| 5,164,839 A | 11/1992 | Lang |
| 5,262,875 A | 11/1993 | Mincer et al. |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,440,334 A | 8/1995 | Walters et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,533,107 A | 7/1996 | Irwin et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Sloane |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,793,851 A | 8/1998 | Albertson |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,077 A | 5/1999 | Harashima |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,963,202 A | 10/1999 | Polish |
| 5,963,861 A | 10/1999 | Hanson |
| 5,974,141 A | 10/1999 | Saito |
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | d-Eon et al. |
| 6,011,794 A | 1/2000 | Mordowitz et al. |
| 6,014,644 A | 1/2000 | Erickson |
| 6,018,710 A * | 1/2000 | Wynblatt et al. ............. 704/260 |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |

(56) References Cited

U.S. PATENT DOCUMENTS

| | | |
|---|---|---|
| 6,064,978 A | 5/2000 | Gardener et al. |
| 6,108,704 A | 8/2000 | Hutton et al. |
| 6,130,933 A | 10/2000 | Miloslaysky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,216,111 B1 | 4/2001 | Walker et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslaysky |
| 6,269,336 B1 | 7/2001 | Ladd et al. |
| 6,269,361 B1 | 7/2001 | Davis et al. |
| 6,275,490 B1 | 8/2001 | Mattaway et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,323,894 B1 | 11/2001 | Katz |
| 6,327,572 B1 | 12/2001 | Morton et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,418,214 B1 | 7/2002 | Smythe et al. |
| 6,430,276 B1 | 8/2002 | Bouvier et al. |
| 6,434,527 B1 | 8/2002 | Horvitz |
| 6,438,216 B1 | 8/2002 | Aktas |
| 6,460,036 B1 | 10/2002 | Herz |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,510,434 B1 | 1/2003 | Anderson et al. |
| 6,523,010 B2 | 2/2003 | Lauffer |
| 6,523,101 B1 | 2/2003 | Nakata |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,570,870 B1 | 5/2003 | Berstis |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 6/2004 | Newkirk |
| 6,769,020 B2 | 7/2004 | Miyazaki et al. |
| 6,807,532 B1 | 10/2004 | Kolls |
| 6,813,346 B2 | 11/2004 | Gruchala et al. |
| 6,836,225 B2 | 12/2004 | Lee et al. |
| 6,847,992 B1 | 1/2005 | Haitsuka et al. |
| 6,850,965 B2 | 2/2005 | Allen |
| 6,859,833 B2 | 2/2005 | Kirsch et al. |
| 6,874,018 B2 | 3/2005 | Wu |
| 6,968,174 B1 | 11/2005 | Trandal et al. |
| 7,028,012 B2 | 4/2006 | St. Vrain |
| 7,035,381 B2 | 4/2006 | D'Ascenzo et al. |
| 7,065,500 B2 | 6/2006 | Singh et al. |
| 7,076,037 B1 | 7/2006 | Gonen et al. |
| 7,092,901 B2 | 8/2006 | Davis et al. |
| 7,120,235 B2 | 10/2006 | Altberg et al. |
| 7,177,415 B1 | 2/2007 | Kim et al. |
| 7,200,413 B2 | 4/2007 | Montemer |
| 7,212,615 B2 | 5/2007 | Wolmuth |
| 7,224,781 B2 | 5/2007 | Jacob et al. |
| 7,231,405 B2 | 6/2007 | Xia |
| 7,340,048 B2 | 3/2008 | Stern et al. |
| 7,363,254 B2 | 4/2008 | Skinner |
| 7,428,497 B2 | 9/2008 | Agarwal et al. |
| 7,453,998 B2 | 11/2008 | Jacob et al. |
| 7,564,958 B1 * | 7/2009 | Contractor .............. 379/93.15 |
| 7,949,529 B2 * | 5/2011 | Weider ............. G06F 17/30864 704/235 |
| 8,027,878 B2 | 9/2011 | Wong et al. |
| 8,140,392 B2 | 3/2012 | Altberg et al. |
| 8,180,676 B2 | 5/2012 | Altberg et al. |
| 8,200,534 B2 | 6/2012 | Wong et al. |
| 8,484,084 B2 | 7/2013 | Altberg et al. |
| 8,521,596 B2 | 8/2013 | Altberg et al. |
| 8,538,768 B2 | 9/2013 | Agarwal et al. |
| 8,681,952 B2 | 3/2014 | Agarwal et al. |
| 8,700,461 B2 | 4/2014 | Wong et al. |
| 8,837,698 B2 | 9/2014 | Altberg et al. |
| 8,856,014 B2 | 10/2014 | Agarwal et al. |
| 8,934,614 B2 | 1/2015 | Altberg et al. |
| 9,105,032 B2 | 8/2015 | Altberg et al. |
| 9,118,778 B2 | 8/2015 | Altberg et al. |
| 9,305,304 B2 | 4/2016 | Faber et al. |
| 9,317,855 B2 | 4/2016 | Altberg et al. |
| 2001/0010043 A1 | 7/2001 | Lauffer |
| 2001/0012913 A1 | 8/2001 | Iliff |
| 2001/0016826 A1 | 8/2001 | Lauffer |
| 2001/0018662 A1 | 8/2001 | Lauffer |
| 2001/0027481 A1 | 10/2001 | Whyel |
| 2001/0029322 A1 | 10/2001 | Iliff |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0010608 A1 | 1/2002 | Faber et al. |
| 2002/0010616 A1 | 1/2002 | Itzhaki |
| 2002/0026457 A1 | 2/2002 | Jensen |
| 2002/0029241 A1 | 3/2002 | Yokono et al. |
| 2002/0038233 A1 | 3/2002 | Shubov et al. |
| 2002/0044640 A1 | 4/2002 | Meek et al. |
| 2002/0057776 A1 | 5/2002 | Dyer |
| 2002/0059591 A1 * | 5/2002 | Nakagawa ......... G06Q 30/0269 725/36 |
| 2002/0062393 A1 * | 5/2002 | Borger et al. ................ 709/246 |
| 2002/0065959 A1 | 5/2002 | Kim et al. |
| 2002/0077987 A1 * | 6/2002 | Hasegawa .............. G06Q 30/02 705/52 |
| 2002/0087565 A1 | 7/2002 | Hoekman et al. |
| 2002/0090203 A1 | 7/2002 | Mankovitz |
| 2002/0095331 A1 | 7/2002 | Osman et al. |
| 2002/0107697 A1 | 8/2002 | Jensen |
| 2002/0107805 A1 | 8/2002 | Kamimura et al. |
| 2002/0120554 A1 | 8/2002 | Vega |
| 2002/0122547 A1 | 9/2002 | Hinchey et al. |
| 2002/0133388 A1 | 9/2002 | Lauffer |
| 2002/0133402 A1 | 9/2002 | Faber et al. |
| 2002/0133570 A1 | 9/2002 | Michel |
| 2002/0133571 A1 | 9/2002 | Jacob et al. |
| 2002/0141404 A1 | 10/2002 | Wengrovitz |
| 2002/0143631 A1 * | 10/2002 | Hasegawa .............. G06Q 30/02 705/14.69 |
| 2002/0156815 A1 | 10/2002 | Davie |
| 2002/0161646 A1 | 10/2002 | Gailey et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0026397 A1 | 2/2003 | McCroskey |

(56) References Cited

U.S. PATENT DOCUMENTS

| | | |
|---|---|---|
| 2003/0036686 A1 | 2/2003 | Iliff |
| 2003/0043981 A1 | 3/2003 | Lurie et al. |
| 2003/0046161 A1 | 3/2003 | Kamanger et al. |
| 2003/0046361 A1 | 3/2003 | Kirsch et al. |
| 2003/0083042 A1 | 5/2003 | Abuhamdeh |
| 2003/0105824 A1 | 6/2003 | Brechner et al. |
| 2003/0135095 A1 | 7/2003 | Iliff |
| 2003/0138091 A1 | 7/2003 | Meek et al. |
| 2003/0153819 A1 | 8/2003 | Iliff |
| 2003/0163299 A1 | 8/2003 | Iliff |
| 2003/0188240 A1* | 10/2003 | Perner ............... 714/726 |
| 2003/0195787 A1 | 10/2003 | Brunk et al. |
| 2003/0212600 A1 | 11/2003 | Hood et al. |
| 2003/0212759 A1* | 11/2003 | Wu ............... 709/218 |
| 2003/0220866 A1* | 11/2003 | Pisaris-Henderson et al. 705/37 |
| 2003/0223563 A1 | 12/2003 | Wolmuth |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0008834 A1 | 1/2004 | Bookstaff |
| 2004/0010518 A1 | 1/2004 | Montemer |
| 2004/0023644 A1 | 2/2004 | Montemer |
| 2004/0076403 A1 | 4/2004 | Mankovitz |
| 2004/0083133 A1 | 4/2004 | Nicholas et al. |
| 2004/0091093 A1 | 5/2004 | Bookstaff |
| 2004/0096110 A1 | 5/2004 | Yogeshwar et al. |
| 2004/0162757 A1 | 8/2004 | Pisaris-Henderson |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0204997 A1 | 10/2004 | Blaser et al. |
| 2004/0103024 A1 | 11/2004 | Patel et al. |
| 2004/0234049 A1 | 11/2004 | Melideo |
| 2004/0234064 A1 | 11/2004 | Melideo |
| 2004/0235524 A1 | 11/2004 | Abuhamdeh |
| 2004/0236441 A1 | 11/2004 | Melideo |
| 2004/0247092 A1 | 12/2004 | Timmins et al. |
| 2004/0249649 A1 | 12/2004 | Stratton et al. |
| 2004/0249778 A1 | 12/2004 | Itiff |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0018829 A1 | 1/2005 | Baker |
| 2005/0021744 A1 | 1/2005 | Haitsuka et al. |
| 2005/0038686 A1 | 2/2005 | Lauffer |
| 2005/0041647 A1 | 2/2005 | Stinnie |
| 2005/0044238 A1 | 2/2005 | Jacob et al. |
| 2005/0048961 A1 | 3/2005 | Ribaudo et al. |
| 2005/0065811 A1 | 3/2005 | Chu et al. |
| 2005/0065909 A1* | 3/2005 | Musgrove ............... G06Q 30/02 |
| 2005/0074100 A1 | 4/2005 | Lederman |
| 2005/0074102 A1 | 4/2005 | Altberg et al. |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0086316 A1* | 4/2005 | Chen ............... 709/207 |
| 2005/0096980 A1 | 5/2005 | Koningstein |
| 2005/0100153 A1 | 5/2005 | Pines et al. |
| 2005/0105881 A1 | 5/2005 | Mankovitz |
| 2005/0114208 A1 | 5/2005 | Arbuckle et al. |
| 2005/0114210 A1 | 5/2005 | Faber et al. |
| 2005/0120011 A1* | 6/2005 | Dehlinger ............... G06F 17/2705 |
| 2005/0125416 A1 | 6/2005 | Kirsch et al. |
| 2005/0135387 A1 | 6/2005 | Rychener et al. |
| 2005/0154616 A1 | 7/2005 | Illif |
| 2005/0165285 A1 | 7/2005 | Iliff |
| 2005/0165666 A1 | 7/2005 | Wong et al. |
| 2005/0203799 A1 | 9/2005 | Faber et al. |
| 2005/0209874 A1 | 9/2005 | Rossini |
| 2005/0216341 A1 | 9/2005 | Agarwal et al. |
| 2005/0216345 A1 | 9/2005 | Altberg et al. |
| 2005/0220289 A1 | 10/2005 | Reding |
| 2005/0222908 A1 | 10/2005 | Altberg et al. |
| 2005/0240432 A1 | 10/2005 | Jensen |
| 2005/0245241 A1 | 11/2005 | Durand et al. |
| 2005/0251445 A1 | 11/2005 | Wong et al. |
| 2005/0261964 A1 | 11/2005 | Fang |
| 2005/0286688 A1 | 12/2005 | Scherer |
| 2005/0289015 A1 | 12/2005 | Hunter et al. |
| 2006/0003735 A1 | 1/2006 | Trandal et al. |
| 2006/0004627 A1 | 1/2006 | Baluja |
| 2006/0069610 A1 | 3/2006 | Rossini |
| 2006/0074760 A1 | 4/2006 | Helin |
| 2006/0095343 A1 | 5/2006 | Clarke et al. |
| 2006/0106711 A1 | 5/2006 | Melideo |
| 2006/0136310 A1 | 6/2006 | Gonen et al. |
| 2006/0159063 A1 | 7/2006 | Kumer |
| 2006/0166655 A1 | 7/2006 | Montemer |
| 2006/0171520 A1 | 8/2006 | Kliger |
| 2006/0173287 A1 | 8/2006 | Kliger |
| 2006/0173915 A1 | 8/2006 | Kliger |
| 2006/0182250 A1 | 8/2006 | Melideo |
| 2006/0184417 A1 | 8/2006 | Van der Linden et al. |
| 2006/0200380 A1 | 9/2006 | Ho et al. |
| 2006/0247999 A1 | 11/2006 | Gonen et al. |
| 2006/0259365 A1 | 11/2006 | Agarwal et al. |
| 2006/0277108 A1 | 12/2006 | Altberg et al. |
| 2007/0005585 A1 | 1/2007 | Feng et al. |
| 2007/0011240 A1 | 1/2007 | Altberg et al. |
| 2007/0022011 A1 | 1/2007 | Altberg et al. |
| 2007/0038507 A1 | 2/2007 | Kumer |
| 2007/0067219 A1 | 3/2007 | Altberg et al. |
| 2007/0078717 A1 | 4/2007 | Ho et al. |
| 2007/0081662 A1 | 4/2007 | Altberg et al. |
| 2007/0083408 A1 | 4/2007 | Altberg et al. |
| 2007/0100956 A1 | 5/2007 | Kumer |
| 2007/0116217 A1 | 5/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0127650 A1 | 6/2007 | Altberg et al. |
| 2007/0129054 A1 | 6/2007 | Andronikov et al. |
| 2007/0130014 A1 | 6/2007 | Altberg et al. |
| 2007/0140451 A1 | 6/2007 | Altberg et al. |
| 2007/0143182 A1 | 6/2007 | Faber et al. |
| 2007/0162296 A1 | 7/2007 | Altberg et al. |
| 2007/0174124 A1 | 7/2007 | Zagofsky et al. |
| 2007/0230374 A1 | 10/2007 | Altberg et al. |
| 2007/0230671 A1 | 10/2007 | Altberg et al. |
| 2007/0230679 A1 | 10/2007 | Altberg et al. |
| 2007/0242626 A1 | 10/2007 | Altberg et al. |
| 2007/0269038 A1 | 11/2007 | Gonen et al. |
| 2007/0280443 A1 | 12/2007 | Jacob et al. |
| 2008/0187114 A1 | 8/2008 | Altberg et al. |
| 2008/0313039 A1 | 12/2008 | Altberg et al. |
| 2009/0060148 A1 | 3/2009 | Jacob |
| 2009/0067599 A1 | 3/2009 | Agarwal et al. |
| 2011/0264517 A1 | 10/2011 | Ho et al. |
| 2013/0262240 A1 | 10/2013 | Altberg et al. |
| 2013/0325635 A1 | 12/2013 | Altberg et al. |
| 2014/0207588 A1 | 7/2014 | Wong et al. |
| 2016/0012476 A1 | 1/2016 | Altberg et al. |
| 2016/0042406 A1 | 2/2016 | Altberg et al. |
| 2016/0050187 A1 | 2/2016 | Altberg et al. |
| 2016/0196583 A1 | 7/2016 | Altberg et al. |

FOREIGN PATENT DOCUMENTS

| | | |
|---|---|---|
| CA | 2475965 A1 | 4/2005 |
| CA | 2504623 A1 | 9/2005 |
| CA | 2506360 A1 | 10/2005 |
| CA | 2504629 A1 | 11/2005 |
| CA | 2566312 A1 | 11/2005 |
| CA | 2599184 A1 | 8/2006 |
| CA | 2599371 A1 | 8/2006 |
| CA | 2624389 A1 | 4/2007 |
| CA | 2685678 A1 | 11/2008 |

(56) References Cited

FOREIGN PATENT DOCUMENTS

| | | |
|---|---|---|
| CA | 2690837 A1 | 1/2010 |
| CN | 1836438 A | 9/2006 |
| CN | 1839405 A | 9/2006 |
| CN | 1998018 B | 7/2007 |
| CN | 101124557 A | 2/2008 |
| CN | 101258474 A | 9/2008 |
| EP | 1522944 A1 | 4/2005 |
| EP | 1636751 A2 | 3/2006 |
| EP | 1646979 A2 | 4/2006 |
| EP | 1665156 A2 | 6/2006 |
| EP | 1754187 A2 | 2/2007 |
| EP | 1759344 A2 | 3/2007 |
| EP | 1851679 A2 | 11/2007 |
| EP | 1880340 A2 | 1/2008 |
| EP | 1938566 A2 | 7/2008 |
| EP | 1977385 A2 | 10/2008 |
| EP | 1977590 A2 | 10/2008 |
| EP | 2153399 A2 | 2/2010 |
| EP | 2201521 A2 | 6/2010 |
| GB | 2329046 A | 10/1999 |
| GB | 2407229 A | 4/2006 |
| GB | 2424973 A | 10/2006 |
| GB | 2425375 A | 10/2006 |
| GB | 2430767 A | 4/2007 |
| JP | 409233441 A | 9/1997 |
| JP | 409319812 A | 12/1997 |
| JP | 2005115945 A | 4/2005 |
| JP | 2005141583 | 6/2005 |
| KR | 20010086595 A | 9/2001 |
| KR | 20030043827 | 6/2003 |
| WO | WO 1997005733 | 2/1997 |
| WO | WO 1998002835 | 1/1998 |
| WO | WO 1998004061 | 1/1998 |
| WO | WO 1998013765 | 4/1998 |
| WO | WO 1998038558 | 9/1998 |
| WO | WO 1998047295 | 10/1998 |
| WO | WO 1999055066 | 10/1999 |
| WO | WO 2002044870 | 6/2002 |
| WO | WO 2002088880 | 11/2002 |
| WO | WO 2005040962 | 5/2005 |
| WO | WO 2005086980 | 9/2005 |
| WO | WO 2005101269 | 10/2005 |
| WO | WO 2005109287 A2 | 11/2005 |
| WO | WO 2005109288 A2 | 11/2005 |
| WO | WO 2005111887 A2 | 11/2005 |
| WO | WO 2005111893 A2 | 11/2005 |
| WO | WO 2006091966 A2 | 8/2006 |
| WO | WO 2006091970 A2 | 8/2006 |
| WO | WO 2007028173 A2 | 3/2007 |
| WO | WO 2007038618 A2 | 4/2007 |
| WO | WO 2007086991 A2 | 8/2007 |
| WO | WO 2007086992 A2 | 8/2007 |
| WO | WO 2008005779 A2 | 1/2008 |
| WO | WO 2008033953 A2 | 3/2008 |
| WO | WO 2008040010 A2 | 4/2008 |
| WO | WO 2008040013 A2 | 4/2008 |
| WO | WO 2008052083 A1 | 5/2008 |
| WO | WO 2008058295 A1 | 5/2008 |
| WO | WO 2008070327 A2 | 6/2008 |
| WO | WO 2008134207 A1 | 11/2008 |
| WO | WO 2010005420 A2 | 1/2010 |

OTHER PUBLICATIONS

Dalianis, Hercules, "Automatic Text Summarization," presentation located at http://people.dsv.su.se/~hercules/kurser/nlg/NLG_Sum_9-GSLT-OH.pdf, 2003.
Kang, Dae-Ki et al., "Multinomial Event Model Based Abstraction for Sequence and Text Classification," Abstraction, Reformulation and Approximation, 6th International Symposium (SARA 2005), pp. 134-148, Jul. 26, 2005.
Karakaya, K. Murat et al., "ARG: A Tool for Automatic Report Generation," Instanbul University Journal of Electrical & Electronics Engineering, vol. 4, No. 2, pp. 1101-1109, 2004.
"Applying Technology News," Accounting Technology, p. 14 (Feb./Mar. 1997).
"Connecting to On-Line Car Shoppers: Auto Sellers Use Netcall Internet Call-Button Technology to Turn Clicks into Interactive Sales", Business Wire, p. 4089, Jul. 1999.
"DHTML for the World Wide Web," Jason Cranford, 1998, Peachpit Press, pp. 150 and 151.
"Expertcity.com Launches Premier Online Marketplace for Expert Services," PR Newswire (Aug. 1999).
"Introducing 1-800-FREE411: First Nationwide Free Telephone Directory Assistance Service" Jingle Networks, Inc., Huntington Beach, Calif., Sep. 20, 2005.
"Keen.com TM Launches First Live Answer Community TM, Connects People with Information to Share Over Their Standard Telephone", Press Release [retrieved from http://keen.com] (Oct. 24, 2000), published Nov. 8, 1999.
"Lucent Technology and Netscape Team to Deliver Lucent Ecommerce Solutions," Business Wire, Sep. 1998.
"Netcall Internet Call Buttons Enhance E-Commerce Customer Service and Sales", PR Newswire, p. 7431, Oct. 1999.
"Surfbrains.com: Brains online save time & money," M2 Presswire, Jul. 11, 2000.
"UpSnap Selects LookSmart to Sell Premium Listings on Free 411 Service for Text-Enabled Cell Phones", Nov. 4, 2004.
"USA Global Link Brings Interactively to Internet Shopping," Business Wire, Dec. 1998.
"Walker Digital Issued Landmark U.S. Pat. No. 5,862,223 for Global Internet Marketplace for Experts", Business Wire, Jan. 26, 1999.
"TriNet's, Help Me, I'm Stuck, Internet Voice Button Services Pushes Web Pages to Online Users," Business Wire, Mar. 1998.
Abhaya Asthana and Paul Krzyzanowski, "A Small Domain Communications System for Personalized Shopping Assistance," Proceedings of ICPWC'94, Publication No. 0/7803-1996-6/94, IEEE, 1994, pp. 199-203.
ADS-Click, "ADS-click Adds Skype-Based Pay-Per-Call Advertising Capabilities to Its Private-Labeled Solution, Which Will Be Unveiled at ad:tech New York," Market Wire, Oct. 10, 2005.
America Online Launches New Yellow Pages 'Bot' to Make American Online Yellow Pages more convenient and accessible than ever, Jun. 26, 2003, Newswire.
Amir Herzberg, et al., "MiniPay: Charging Per Click on the Web," Computer Networks and ISDN Systems 29, (Sep. 1997) vol. 29, pp. 939-951.
Answers.com Web Page (www.answers.com), Aug. 8, 2000.
Aspect Telecomm: Aspect Integrates the Web into the Call Center, M2 Presswire, Aug. 1996.
"AtOnce Talks Up E-mail Marketing Campaigns with ITXC Push to Talk Service," Business Wire, Feb. 26, 2001.
Barbara Jarvie, "Company Devoted to Hot-Line Support", Computer Reseller News, Oct. 21, 1991, p. 48.
Big Reseller Blog: Jan. 2005 Archives, Feb. 21, 2006.
Brian Quinton, "Pay-per-Call Picks Up Speed", Oct. 1, 2005.
Chris Ott, "Making Good on the Information Economy," Denver Business Journal, Dec. 17, 1999, p. 27.
Christina Wood, "Hidden Cost of Tech Support", PC World, May 1995, pp. 143-152 & p. 156.
Collett, Stacey & Julie King, 'Why Online Browsers Don't Become Buyers, Computerworld, vol. 33, No. 48, p. 14 (Nov. 1999).
Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129, Nov. 1996.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
Edith Herman, "US Courts to Launch First Federal 900 Service," Federal Computer Week, Sep. 28, 1992, p. 8.
Ellen Greenblatt, "Have you ever wondered . . . ," Datamation, Oct. 1997, p. 12.
EP Application No. 05745704.6, Examination Report, Feb. 1, 2010.
EXP.com Web Site at www.exp.com, Sep. 20, 2000.

(56) References Cited

OTHER PUBLICATIONS

Fair Disclosure Wire, Full Year 2003 and Q4 ebookers plc Earnings conference call, Mar. 22, 2004.
For Telesphere's Clients, Dial '1-900-TUF LUCK', Business Week, Sep. 9, 1991, 88.
Franco Mercalli, et al., "TheESSAI Teleshopping System: An Example of Broadband Multimedia Application," Publication No. 0-7803-1820-X/94, IEEE, pp. 572-576 (1994).
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Gregory Dalton, "Rent-An-Expert on the Web," Information Week p. 75 (Sep. 6, 1999).
Healey, Jon, "From A to Z, You Can Sell Advice Online." Retrieved from http://www.mercurycenter.com on Oct. 24, 2000, published on Nov. 7, 1999.
Infomarkets.com Web Site (www.infomarkets.com), Aug. 8, 2000.
Information about Expertcity.com retrieved from the Internet [http://www.expertcity.com] on Nov. 6, 2000.
Information, Bid and Asked, Forbes, Aug. 20, 1990, 92.
Ingenio Press Archives for 2004, www.ingenio.com, Feb. 21, 2006.
Ingenio, Inc., "FindWhat.corn Enters Agreement with Ingenio to Offer Pay Per Call Advertising Platform," press available at http://www.ingenio.com, Apr. 7, 2004.
Intellect Exchange Web Site (www.intellectexchange.com), Aug. 8, 2000.
International Application No. PCT/US04/15238, Written Opinion and International Search Report, dated Aug. 29, 2005.
International Application No. PCT/US05/08379, Written Opinion and International Search Report, dated Nov. 17, 2006.
International Application No. PCT/US05/15631, Written Opinion and International Search Report, dated Feb. 22, 2007.
International Application No. PCT/US05/15646, Written Opinion and International Search Report, dated Jan. 29, 2007.
International Application No. PCT/US07/82445, Written Opinion and International Search Report, dated May 23, 2008.
International Application No. PCT/US2008/059687, Written Opinion and International Search Report, dated Aug. 25, 2008.
ISA/US, International Search Report for International Application No. PCT/US05/12061, 3 pages, dated Nov. 17, 2006.
ISDN Tutorial: Definitions, http://www.ralphb.net/ISDN/defs.html (Apr. 21, 2000).
ISDN Tutorial:Interfaces, http://www.ralphb.net/ISDN/ifaces.html, printed on Apr. 21, 2000.
"ITXC Corp and Doubleclick Energize Banner Ads with Web Telephony; Companies Voice-Enable Banner Using ITXC Push to Talk Service," Business Wire, Dec. 12, 2000.
J. Sairamesh, et al., NetBazaar: Networked Electronic Markets for Trading Computation and Information Research and Advanced Technology for Digital Libraries, Second European Conference, ECDL 1998, pp. 839-856 (Sep. 21-23, 1998).
J.W.R. Griffiths, et al., "Multimedia Communication in a Medical Environment", IEEE 1991 Singapore I.C. on Networks, p. 166 (8 pgs.).
Jeff Pelline, "Net Firm to Connect Users by Phone," CNET News. com [retrieved from http://new.cnet.com] (Oct. 24, 2001) published Nov. 8, 1999.
Jingle Networks, Inc., "1-800-FREE411 Provides Two Great Opportunities to Acquire New Customers," available at least by Oct. 20, 2005.
Joann M. Wasik, "Information for Sale: Commercial Digital Reference and AskA Service", Virtual Reference Desk, Sep. 20, 1999, at www.vrd.org/AskA/commAskA.html.
John Robinson, "Attachmate Ready to Answer Net Questions", Network World, Apr. 8, 1996, p. 37.
Joseph Menn, "An Expert? There's Now a Home for You on the Internet", Los Angeles Times (retrieved from http://denverpost.com on Oct. 24, 2001).
Keen.com Feb. 4, 2006.
Keen.com Plans Web Service Allowing Customers to Hold Private Phone Chats, Don Clark, Wall Street Journal, Nov. 8, 1999.
Keen.com raises $60 Million from Prestigious . . . , Business Wire, Jan. 11, 2000.
Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.
Keen.com, Inc. v. InfoRocket.com, Inc., Preliminary Injunction Hearing, pp. 286-289 (Jan. 8, 2002).
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.
Linda Littleton, "Meet the Shadowy Future," Proceedings of ACM SIGUCCS User Services Conference XXII Ypsilanti, Michigan Oct. 16-19, 1994, pp. 205-210.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Michael Kanellos, "Do You Want to Know the Meaning of Life?", Computer Reseller News, Mar. 3, 1997, pp. 72-74.
Michael Rogers et al, "Experts Abound at New Web Sites", Library Journal, Mar. 1, 2000, pp. 22-24.
Patricia Hursh, "Search Advertising that Makes the Phone Ring", Search Engine Watch, Apr. 19, 2005.
PCT Search Report for PCT Application No. PCT/US01/48284, filed Oct. 30, 2001 (corresponding to U.S. Appl. No. 09/702,217) dated May 13, 2002 (7 pgs.).
Peggy Anne Salz, "Pay-Per-Call Mobile Search Model Gains Traction as 'Last Mile' to Mobile Content", Dec. 11, 2006.
Provisional application to Stinnie U.S. Appl. No. 60/492,285, filed Aug. 5, 2003.
Qcircuit Web Site (www.qcircuit.com), Aug. 8, 2000.
Richard A Kuehn, "The Voice of Technology," Credit World, pp. 20-23 (Jul. 1994).
Sean Bolton, "Pay-Per-Call Frenzy", Sep. 14, 2005.
Sell and buy advice online, The Ottawa Citizen, Nov. 29, 1999.
Should Your Yellow Pages Ad Go Online? Meyers, Harriet, Aug. 1998, Journal code: RNO. v141 n8. pp. 36-38.
Tehrani, Rich, "e-Rip Van Winkle and the 60 Second Nap," Call Center Solution, vol. 18, No. 2, pp. 16(3), Oct. 1999.
Telecommunications Buyers Guide and Directory, Editor & Publisher, pp. 29TC-38TC, Feb. 1994.
The Web Site at www.experts-exchange.com, Apr. 9, 2000.
The web-site at www.allexperts.com, Apr. 9, 2000.
U.S. Appl. No. 09/596,466, "Methods and apparatus for providing telephone support for internet sales," Unpublished (filed Jun. 19, 2000), (Craig L. Reding, Inventor) (Bell Atlantic Network Services, Inc., assignee).
U.S. Appl. No. 60/198,642, "Systems and methods for connecting customers to merchants over a voice communication network", Unpublished (filed Apr. 20, 2000), (Peter Rothschild, Inventor).
U.S. Appl. No. 60/471,535, "HyperDial," Unpublished (filed May 19, 2003), (John Melideo, Inventor).
U.S. Appl. No. 60/552,124, "Method and apparatus to provide pay-per-call advertising and billing," Unpublished (filed Mar. 10, 2004), (Scott Faber, Inventor).
U.S. Appl. No. 60/560,926, "Method and apparatus to track demand partners in a pay-per-call performance based advertising system," Unpublished (filed Apr. 9, 2004), (Scott Faber, Inventor).
U.S. Notice of Allowance for U.S. Appl. No. 10/872,117, dated May 3, 2011, 6 pages, USA.
U.S. Notice of Allowance for U.S. Appl. No. 11/014,073, dated Jan. 28, 2008, 9 pages, USA.

(56) References Cited

OTHER PUBLICATIONS

U.S. Notice of Allowance for U.S. Appl. No. 11/021,939, dated May 12, 2011, 9 pages, USA.
U.S. Notice of Allowance for U.S. Appl. No. 11/077,655, dated Mar. 13, 2008, 10 pages, USA.
U.S. Notice of Allowance for U.S. Appl. No. 11/095,853, dated Oct. 7, 2011, 12 pages, USA.
U.S. Office Action for U.S. Appl. No. 10/872,117, dated Feb. 22, 2010, 17 pages, USA.
U.S. Office Action for U.S. Appl. No. 10/872,117, dated Feb. 27, 2009, 45 pages, USA.
U.S. Office Action for U.S. Appl. No. 10/872,117, dated Jul. 27, 2010, 13 pages, USA.
U.S. Office Action for U.S. Appl. No. 10/872,117, dated Nov. 9, 2010, 19 pages, USA.
U.S. Office Action for U.S. Appl. No. 10/872,117, dated Oct. 1, 2009, 20 pages, USA.
U.S. Office Action for U.S. Appl. No. 11/014,073, dated Aug. 28, 2007, 8 pages, USA.
U.S. Office Action for U.S. Appl. No. 11/014,073, datd Feb. 7, 2007, 7 pages, USA.
U.S. Office Action for U.S. Appl. No. 11/014,073, dated Jun. 14, 2006, 27 pages, USA.
U.S. Office Action for U.S. Appl. No. 11/021,939, dated Aug. 16, 2010, 23 pages, USA.
U.S. Office Action for U.S. Appl. No. 11/021,939, dated Mar. 19, 2009, 53 pages, USA.
U.S. Office Action for U.S. Appl. No. 11/021,939, dated Mar. 5, 2010, 23 pages, USA.
U.S. Office Action for U.S. Appl. No. 11/021,939, dated Sep. 18, 2009, 18 pages, USA.
U.S. Office Action for U.S. Appl. No. 11/077,655, dated Jun. 1, 2007, 27 pages, USA.
U.S. Office Action for U.S. Appl. No. 11/077,655, dated Sep. 25, 2006, 27 pages, USA.
U.S. Office Action for U.S. Appl. No. 11/092,309, dated Apr. 17, 2007, 27 pages, USA.
U.S. Office Action for U.S. Appl. No. 11/092,309, dated Sep. 22, 2006, 26 pages, USA.
U.S. Office Action for U.S. Appl. No. 11/092,309, dated Sep. 5, 2007, 8 pages, USA.
U.S. Office Action for U.S. Appl. No. 11/095,853, dated Jul. 26, 2010, 24 pages, USA.
U.S. Office Action for U.S. Appl. No. 11/095,853, dated Mar. 12, 2009, 50 pages, USA.
U.S. Office Action for U.S. Appl. No. 11/095,853, dated Mar. 24, 2010, 23 pages, USA.
U.S. Office Action for U.S. Appl. No. 11/095,853, dated Sep. 29, 2009, 22 pages, USA.
U.S. Transaction History of U.S. Appl. No. 10/679,982, filed Oct. 6, 2003, entitled "Method Apparatus to Provide Pay-Per-Call Performance Based Advertising," now U.S. Appl. No. 7,120,235.
U.S. Transaction History of U.S. Appl. No. 10/956,571, filed Oct. 1, 2004, entitled "Method System to Connect Consumers to Information."
U.S. Transaction History of U.S. Appl. No. 10/956,771, filed Oct. 1, 2004, entitled "Method System to Connect Consumers to Information," now U.S. Appl. No. 7,224,781.
U.S. Transaction History of U.S. Appl. No. 11/021,939, filed Dec. 23, 2004, entitled "Method and Apparatus to Compensate Demand Partners in a Pay-Per-Call Performance Based Advertising System."
U.S. Transaction History of U.S. Appl. No. 11/092,309, filed Mar. 28, 2005, entitled "Methods Apparatuses for Offline Selection of Pay-Per-Call Advertisers," now U.S. Pat. No. 7,366,683.
U.S. Transaction History of U.S. Appl. No. 11/508,015, filed Aug. 21, 2006, entitled "Method Apparatus to Provide Pay-Per-Call Performance Based Advertising."
U.S. Transaction History of U.S. Appl. No. 11/559,866, filed Nov. 14, 2006, entitled "Method and Apparatuses to Track Keywords for Establish Communication Links."
U.S. Transaction History of U.S. Appl. No. 11/565,546, filed Nov. 30, 2006, entitled "Method and Apparatuses to Select Communication Tracking Mechanisms."
U.S. Transaction History of U.S. Appl. No. 11/624,613, filed Jan. 18, 2007, entitled "Method and Apparatuses for Pay for Deal Advertisements."
U.S. Transaction History of U.S. Appl. No. 11/691,372, filed Mar. 26, 2007, entitled "Methods Systems to Connect Consumers to Information."
U.S. Transaction History of U.S. Appl. No. 11/752,267, filed May 22, 2007, entitled "Method and Apparatuses to Connect People for Real Time Communications Via Voice Over Internet Protocol (VoIP)."
U.S. Transaction History of U.S. Appl. No. 11/761,800, filed Jun. 12, 2007, entitled "Method and Apparatuses to Track Information Using Call Signaling Messages."
U.S. Transaction History of U.S. Appl. No. 11/761,932, filed Jun. 12, 2007, entitled "Method and Apparatuses to Track Information Via Passing Information During Telephonic Call Process."
U.S. Transaction History of U.S. Appl. No. 11/761,987, filed Jun. 12, 2007, entitled "Method and Apparatuses to Track Information Via Telephonic Apparatuses."
U.S. Transaction History of U.S. Appl. No. 11/862,111, filed Sep. 26, 2007, entitled and Methods to Facilitate the Specification of a Complex Geographic Area.
U.S. Transaction History of U.S. Appl. No. 12/062,425, filed Apr. 3, 2008, entitled "Methods and Apparatuses for of line Selection of Pay-Per-Call Advertisers."
U.S. Transaction History of U.S. Appl. No. 12/240,807, filed Sep. 29, 2008, entitled "Methods and Systems to Connect Consumers to Information."
Verizon transforms local search with Launch of New SuperPages.com Web site. Mar. 1, 2004. Newswire.
Wagner, Mary, "Caring for Customers: Real-Time text chat and telephony provide personalized customer support and turn queries into sales leads," Internet World Media, Sep. 1999.
'Welcome to Jambo—the leader in Pay-per-Call Solutions (search results) Oct. 17, 2005.
Welcome to the Electronic Emissary Project's WebCenter at www.tapr.org/emmisary/.
When Business Plan and Real World Clash, De Lasser, Eleena, Wall Street Journal, Jun. 9, 1999, 131.
William H. Chimiak, et al, "Multimedia Collaborative Remote Consultation Tools Via Gigabit WAN in Teleradiology," IEEE 1994, Phoenix, p. 417 (7 pgs.).

\* cited by examiner

Call Handling for Web and Phone

SYSTEM AND METHOD FOR PROVIDING ADVERTISEMENT

RELATED APPLICATIONS

The present application claims priority to Provisional U.S. Patent Application Ser. No. 60/818,136, filed Jun. 30, 2006, the disclosure of which is incorporated herein by reference.

The present patent application is related to: U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; U.S. patent application Ser. No. 11/095,853, filed Mar. 30, 2005 and claimed priority from Provisional U.S. Patent Application 60/653,661 filed on Feb. 16, 2005; U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; U.S. patent application Ser. No. 10/679,982, filed Oct. 6, 2003; and U.S. Provisional Application 60/761,972 filed on Jan. 24, 2006. These prior applications are hereby incorporated herein by reference.

BACKGROUND

1. Field

The methods and systems disclosed herein relate to real time communication connections and advertising in general and performance-based advertising in particular.

2. General Background

Telephone systems allow users to conduct real time two-way voice communication. Traditional landline based telephone systems connect one telephone set to another through one or more switching centers, operated by one or more telephone companies, over a landline based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that the advertisement appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page.

SUMMARY

In one aspect, a method includes receiving a text for a first advertisement presentable in a first media type, and converting the text into an abbreviated text for a second advertisement presentable in a second media type. Furthermore, the abbreviated text can be converted into an audio advertisement.

In another aspect, in response to a request received from an advertiser, an audio advertisement is generated based on visual advertisement information. The audio advertisement is provided for representation on behalf of the advertiser. A determination is made as to whether a call from a customer has been connected to the advertiser via the audio advertisement. The advertiser is charged a predefined fee if it is determined that a call from a customer has been connected to the advertiser via the audio advertisement.

In one embodiment, a determination as to whether a call from a customer has been connected to the advertiser via the audio advertisement can be made by performing additional operations. In one example, a call is received from the customer, and information related to the call from the customer is recorded in order to calculate the predetermined fee. The call can be forwarded to the advertiser. Alternatively, a separate connection can be made to the advertiser; and then the phone connections can be joined to connect the customer and the advertiser.

In one embodiment, the visual advertisement information includes text. The visual advertisement can also include an image.

In one embodiment, the audio advertisement can be provided to the customer during a directory assistance call. The directory assistance call received from the customer can be forwarded to the advertiser, or forwarded to the telephone number that can be used to reach the advertiser. Alternatively, the telephone number that can be used to reach the advertiser and to track the call activities to the advertiser is provided to the customer during the directory assistance call, via the audio advertisement, to allow the customer to dial a call separate from the directory assistance call. In one embodiment, the telephone number provided during the directory assistance call is also usable to identify that the telephone number is provided via the audio advertisement; and when the telephone number is called to reach the advertiser, the provider of the directory assistance service can be credited for delivering the audio advertisement to the customer.

In one embodiment, at least a portion of the content of the visual advertisement can be converted into the audio advertisement by summarizing the text of the visual advertisement. For example, the summarization can be performed by extracting words from the visual advertisement information into a summarized text for advertisement. In addition, the summarized text can be converted for advertisement into speech that conveys an audio advertisement message.

In one aspect, a system includes an advertisement creation module, an advertisement publication module, and a call handling module. The advertisement creation module is to generate an audio advertisement based on visual advertisement information in response to a request from an advertiser. The advertisement publication module is to provide the audio advertisement for presentation on behalf of the advertiser. The call handling module is to determine whether a call from a customer has been connected to the advertiser via the audio advertisement, where the advertiser is to be charged a predefined fee if it is determined that a call from a customer has been connected to the advertiser via the audio advertisement.

In one aspect, in response to a request received from an advertiser, a portion of a content of the advertisement is converted into an abbreviated advertisement. The abbreviated advertisement is provided to a customer of the advertiser. A determination is made as to whether a call from the customer has been connected to the advertiser via the abbreviated advertisement. The advertiser is charged a predefined fee if it is determined that a call from the customer has been connected to the advertiser via the abbreviated advertisement. Alternatively, an unabbreviated audio advertisement can be created from a text advertisement. For example, an audio can be created directly and verbatim from what the advertisers (or agent/advertisement creator) created in textual form.

DRAWINGS

By way of example, reference can now be made to the accompanying drawings.

DETAILED DESCRIPTION

The method and system described herein permit an advertiser to deliver advertisements through one or more communications media and pay according to calls received from customers. Thus, advertisers that either (a) do not have web pages, or (b) have web pages that are not effective at capturing the value of a web visitor, and are therefore unable or unwilling to participate in the traditional performance-based advertising as described above, can use the methods and systems according to embodiments of the present invention.

A "pay-per-call" scheme is provided herein, in order to provide advertisers an opportunity to advertise and pay for the advertisement when a customer calls as a response to a delivered or published advertisement. Advertisements can be delivered through computer networks, or telephone networks, or in combination. In addition, advertisements can be in a plurality of formats. For example, an advertiser can establish a campaign of one or more of an audio advertisement, short message advertisement, image advertisement, multimedia advertisement (e.g., via interactive TV), etc. Various techniques are explained herein to deliver advertisements through one or more communication media. In addition, various techniques can be utilized to generate or convert advertisements to audio, short text message, or multimedia format. For example, text-to-speech techniques can be utilized. In another example, text summarization techniques can be utilized.

Figure 1:
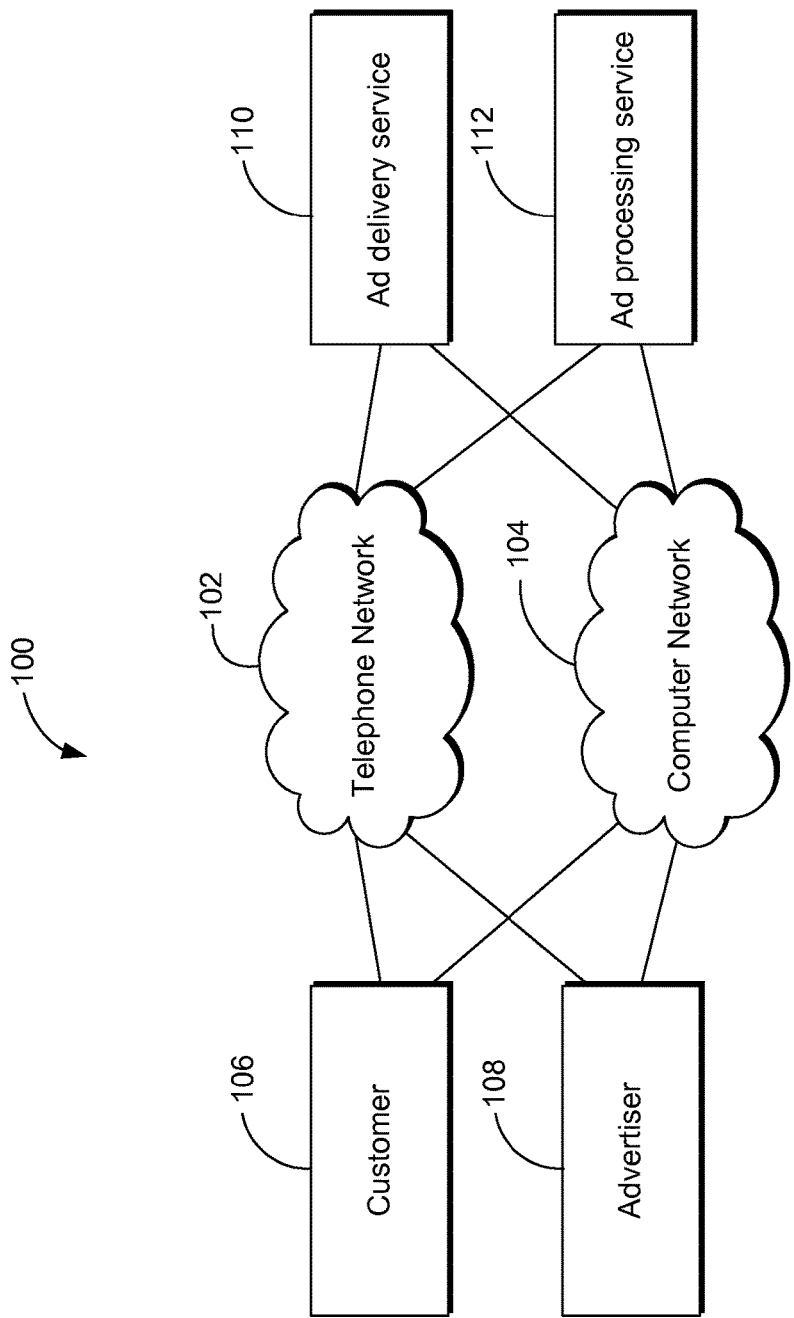
FIG. 1 illustrates a system for advertisement processing delivery and tracking.

FIG. 1 illustrates a system for advertisement processing delivery and tracking. An advertiser 108 can communicate through a computer network 104 with an advertisement processing service 112. The advertiser 108 can request that an advertisement of advertiser 108 be processed, created, summarized and posted by advertisement processing service 112. In addition, the advertiser 108 can also communicate with a customer 106 through a telephone network 102 when a customer 106 calls in response to an advertisement. The customer 106 can also communicate with the advertiser 108 through a computer network 104, for example, by making a PC-to-phone voice call that is transmitted through computer network 104 using voice over Internet Protocol (VoIP) technology. In one embodiment, part of the telephone connection between the customer and the advertiser is via the computer network 104, and part of the telephone connection between the customer and the advertiser is via the telephone network 102 (e.g., a circuit switched network). In one embodiment, the telephone connection between the customer and the advertiser is via the advertisement processing service 112, which has VoIP connections to a telephone carrier (not shown in FIG. 1) which further connects the connections to the advertiser 108 and the customer 106. The customer 106 and the advertiser 108 may use VoIP based on telephone devices, or plain old telephones, mobile phones, USB phones, Bluetooth phones, or one or more speakers or headphones with one or microphones for the implementation of a software based phone, etc.

Although FIG. 1 illustrates an example of using a telephone connection to connect the customer and the advertiser via the advertisement, other types of communication connections, especially real time communication connections, can also be used to connect the customer and the advertiser via the advertisement. The advertiser is charged based on the number of communication leads generated by the advertisement. The communication connections may include connections for video and other multimedia, chat, instant messaging, document sharing, or screen-sharing, common "whiteboarding," interactive TV or internet TV, etc. Each of different multimedia channels can have different prices or be inclusive in one price (e.g., the use of part or all of the different channels can be included in the same price). In one embodiment, VoIP connection between the customer and the advertiser is provided based on Session Initiation Protocol (SIP) which may support video and instant-messaging applications, IP phone, regular phone over VoIP service, Bluetooth wireless phone, USB phone, software based phone, and other forms of IP telephony. In one embodiment, the real time communication connection between the customer and the advertiser is not web-based. Thus, the advertiser does not need a web site to communicate with the customer.

The real time communication may be on a one-to-one basis (e.g., one caller connected to one callee). The real time communication can also be in the form of one-to-many. Further, in one embodiment, the real time communication may include access to recorded sessions (e.g., recorded audio content and/or recorded video content).

In one embodiment, the computer network 104 is the Internet. In another embodiment, the computer network 104 is an intranet. The advertisement processing service 112 can be one or more entities that receive requests from advertiser 108 for processing advertisements, for converting text advertisements to a short text message advertisement, for converting text advertisements to voice or audio advertisement, etc. In one embodiment, a text suitable for presentation as an advertisement in a visual form, such as in a search result of a web page, is converted to an abbreviated form suitable for presentation on a media channel that has a limit on the length of the advertisement. For example, to be effective, an audio advertisement presented during a directory assistance call is preferably limited in length. Typical text advertisements generated for presentation on a web page can be have a length longer than a preferred limit for audio advertisements. In one embodiment, the advertisement processing service 112 provides a service to shorten the text advertisement to generate a corresponding audio advertisement for the advertiser. In one example, the advertiser 108 can communicate through a website hosted by the advertisement processing service 112 and submit a request for a creation of an advertisement, conversion of an advertisement or publication of an advertisement, etc.

In one embodiment, the advertisement processing service can also track calls that are made to the advertiser 108 in accordance to the pay-per-call business scheme. In addition, the advertisement processing service 112 can communicate with an advertisement delivery service 110.

The advertisement delivery service 110 can be a search engine that posts advertisements that have been processed by the advertisement processing service 112. In another example, the advertisement delivery service 110 can be a bulletin board company that posts advertisements processed by the advertisement processing service 112. In yet another embodiment, the advertisement delivery service 110 can be a directory assistance service that delivers advertisements to a customer who calls to make a directory assistance request (e.g. 411 services).

The advertisement processing service 112 can submit preprocessed advertisements in the form of text or audio to the advertisement delivery service 110. The advertisement delivery service 110 can deliver the advertisements to customers at suitable times and places. If the advertisement delivery service 110 is a directory assistance company, the advertisement can be delivered through the telephone network 102. Then, the advertisement can be presented to the customer 106 during the directory assistance call.

In another example, if the advertisement delivery service 110 is a search engine or any other website that includes pop-up advertisements, banner advertisements or any other form of advertisement on the worldwide web, the advertisement delivery service can communicate through computer network 104 with customer 106. Customer 106 can receive the advertisement on a personal computing device. Once the advertisement has been delivered or published, the customer can select to be connected to the advertiser 108 through the telephone network 102 or internet. Alternatively, once the advertisement has been published on a website or any other visual medium, the customer 106 can dial an advertised telephone number to request a phone connection to the advertiser 108. When the advertised telephone number is dialed, the call is connected to the advertisement processing service 112, enabling the advertisement processing service 112 to track the calls made to the advertiser 108 via the advertised telephone number. The advertisement processing service 112 may forward the call to the advertiser, or make a separate connection to the advertiser and then join/conference the advertiser and the customer.

In one embodiment, the customer 106 is presented with a telephone number that has been associated to advertiser 108. The telephone number can be a number generated by the advertisement processing service and assigned to the advertiser. In addition, the telephone number can be for the advertisement processing service 112 such that calls to the generated telephone number are routed to the advertisement processing service 112. The advertisement processing service 112 upon receiving the call from the customer can search and match the telephone number received or dialed from the customer and match the telephone number against the advertiser's 108 telephone number. The advertisement processing service can then forward the call to the advertiser 108 and simultaneously track that a call has been received from customer 106 for advertiser 108.

In another embodiment, the advertisement delivery service 112 is configured to receive the call directed to advertiser 108 from customer 106. For example, if the advertisement delivery service is a directory assistance service, upon presenting an audio advertisement to the customer 106 during the directory assistance call, the advertisement delivery service 110 can re-route the call to advertiser 108 if the customer 106 approves of such forwarding. If the call is forwarded to advertiser 108 (e.g., according to the record of the directory assistance service), advertiser 108 is charged a pre-determined amount. In another example, the call is not forwarded to advertiser 108, but the advertisement is presented to customer 106 together with the phone number that is assigned by the advertisement processing service 112 to the advertiser; thus, when the assigned phone number is dialed, the advertisement processing service 112 can track the call and charge the advertiser a pre-determined amount (e.g., according to a pay per call price bid specified by the advertiser). In a further example, the call is forwarded to the advertisement processing service 112 at the phone number assigned to the advertiser; the advertisement processing service 112 further connects the call to the advertiser based on the association between the assigned phone number and the advertiser; thus, the advertisement processing service 112 can track the calls to the advertiser. In one embodiment, the assigned phone number is also associated with the directory assistance service; thus, when the call is connected to the advertiser via the assigned phone number, the advertisement delivery service 110 may be credited for the call. Alternatively, the advertisement processing service 112 may charge the advertiser on a pay per call basis, while purchasing advertisement slots from the advertisement delivery service 110 based on a different price model, such as on a monthly fee, a flat fee for each presentation of the advertisement, etc. In one embodiment the advertisement delivery service 110 and the advertisement processing service 112 are part of the same business entity. In another embodiment, the advertisement delivery service 110 is a separate business entity than a business entity that processes advertisements according to advertisement processing service 112.

In one embodiment, the customer 106 requests a telephone connection to the advertiser 108 via a telephone reference, such as a phone number assigned by the advertisement processing service 112 to the advertiser 108. In another embodiment, the customer 106 requests a telephone connection via a non-telephone connection, such as a web connection. For example, a hyperlink can be used to allow the customer to request a telephone connection to the advertiser. When the hyperlink is selected, the telephone number of the customer is further collected in a web page; the telephone number of the advertiser can be looked up based on a parameter embedded in the hyperlink; and then, the advertisement processing service 112 can make separate calls (e.g., initiated via VoIP telephony service provided by a telephone carrier) and then join the calls to connect to the customer and the advertiser. Alternatively, the customer may request the telephone connection via a short text message, an instant message, or via other communication methods.

Figure 2:
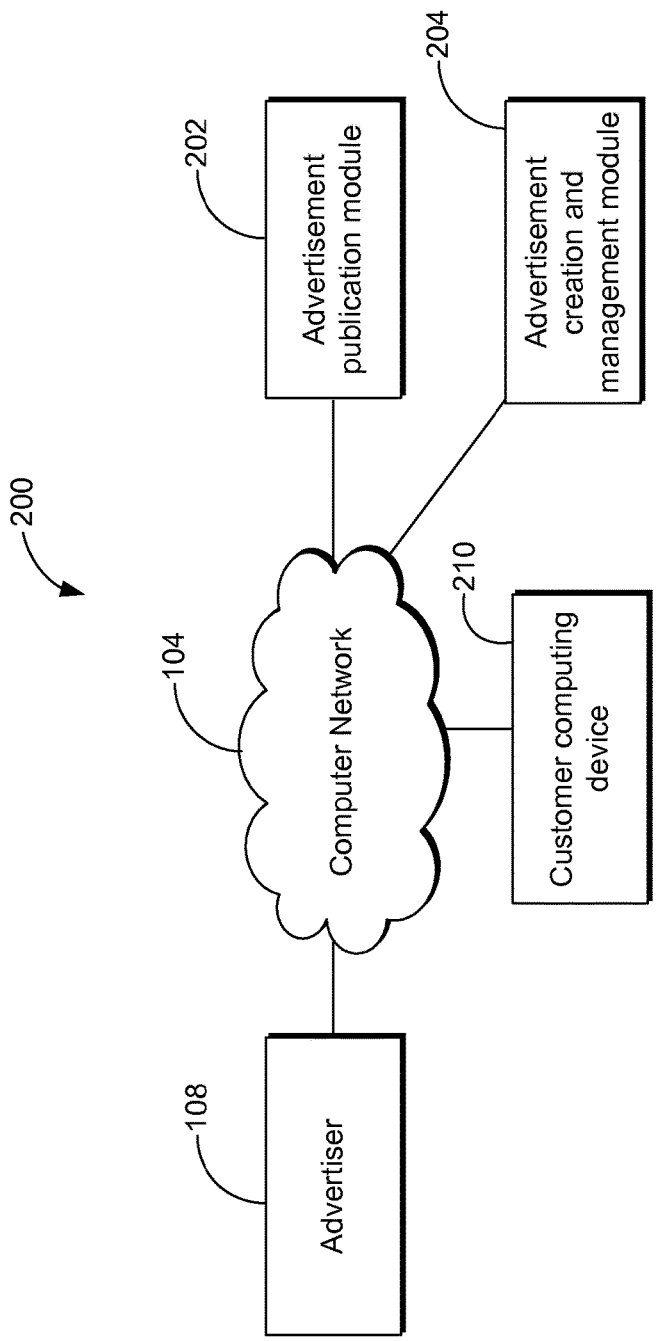
FIG. 2 illustrates a system for advertisement publication via a computer network.

FIG. 2 illustrates a system for advertisement publication via a computer network. The advertiser 108 can request the creation of an advertisement through computer network 104 from an advertisement processing service 112. In one embodiment, the advertisement processing service 112 can include an advertisement creation and management module 204. The account creation and management module 112 can reside in a computer server that is configured to communicate with a computer network 104. In addition, the computer server can further communicate with the advertiser 108 so as to receive instructions for creation of advertisements. As such, the advertiser 108 can utilize a website hosted by the computer server to submit requests for advertisement creation, maintenance and in general preparation of an advertisement for later publication or delivery to a customer. As such, an advertiser 108 can utilize a web browser or another graphical user interface to submit and receive an advertisement creation and management data from the advertisement creation and management module 204. In one example, the advertisement creation and management module 204 can further be configured to convert text advertisements previously submitted by an advertiser 108 into shorter text and convert the shorter text into speech. In one example, the advertisement creation and management module 204 can further be configured to convert image advertisements previously submitted by an advertiser 108 into an audio advertisement.

Thus, an advertiser 108 can submit a string of text by typing the string of text in a field for entering text provided in a web page hosted by the advertisement processing service. The string of text is submitted through the computer network 104 to the advertisement creation and management module 204. Once the string of text is received, the string of text can be processed to include a telephone number assigned to the advertiser 108 and/or other references that can be used to request a telephone connection to the advertiser 108, such as a hyperlink.

In another embodiment, once the string of text is received not only can a telephone number that is assigned to the advertiser 108 be injected into the string of text, but also the string of text can be reduced or summarized into a smaller or shorter text message. A summarization technique based on extraction or abstraction can be used to reduce the length of the text. For example, an extraction method can rank the sentences and selectively extract a set of sentences to generate a shorter version of the text message. An abstraction method parses the text message, interpreting the text, finding concepts to describe the text, and generating a short text to describe the concepts. Summarization can be performed by a data processing system at a reduced cost. Summarization can be also be performed by a human operator with high quality. In one embodiment, summarizations generated by a data processing system are used initially. The machine generated summarizations can be reviewed by the advertisers and/or selectively reviewed by human operators. In one embodiment, different text advertisements are prioritized (e.g., based on the past performance of the advertisements, based on the difficulties the advertisers encountered in accepting the machine generated summarization, etc.); based on the priority ranking the advertisements are selectively reviewed or summarized by human operators.

Therefore, the advertisement creation and management module 204 can be configured to carry out summarization of text. In another embodiment, the creation and management module 204 can be configured to provide operations and functions to a user who performs the summarization of the text.

In addition, the advertisement creation and management module 204 can also be configured to convert from text to an audio format (e.g., in speech recognizable to a human). The advertisement creation and management module 204 can utilize text to speech conversion techniques and methods known in the art to extract relevant words from the string of text in order to produce the audio advertisement.

Alternatively, the advertisement creation and management module 204 can also be configured to assist a user or operator to create an audio advertisement by providing recording and sound editing functions.

In one embodiment, the advertisement creation and management module 204 can further communicate and interact with a web server coupled to the advertisement creation and management module 204 to transmit and receive messages from the advertiser 108 through computer network 104. Thus, for example, advertiser 108 can utilize a computing device such as a personal computer, a portable computing device, etc. to interface with a web application and submit edits, delete commands or change advertisement campaign preferences. For example, the advertiser 108 may be able to indicate the time in which a certain advertisement should be published or delivered.

An advertisement publication module 202 can be utilized for publishing and delivering the advertisement or advertisements of an advertiser 108 to a customer 106. The advertisement publication module 202 can be configured to interact with the advertisement creation and management module 204 to receive advertisements that are to be delivered or published or presented to a customer. In one embodiment, the advertisement creation and management module 204 transmits the advertisements through computer network 104 to the advertisement publication module 202. Any other forms of transmission can be utilized to convey the advertisements to be published by the advertisement publication module 202. The advertisement publication module 202 can be part of the advertisement delivery service 110 discussed in the description of FIG. 1. The advertisement publication module 202 can be part of a web service or a website hosted by the advertisement delivery service 110 which presents advertisements in the form of advertisement banners on a website or advertisement pop-ups on a website, etc. As such, the advertisement publication module 202 can deliver the advertisements of the advertiser 108 through the computer network 104 and to the customer computing device 210. The customer computing device can be configured with a web browser that receives advertisement or advertisements delivered from the advertisement publication module 202 as part of a website. The advertisements are then displayed on a web page or another application residing at the customer computing device 210. The advertisements can therefore be displayed in a display of the customer computing device 210. A customer 106 that utilizes the customer computing device 210 can view the advertisement and the telephone number associated with the advertisement, and be persuaded to call the advertiser 108 utilizing the advertised telephone number (or a hyperlink). The customer computing device 210 can be a personal data assistant, a laptop computer, cellular phone or any other portable device or computing device.

Figure 3:
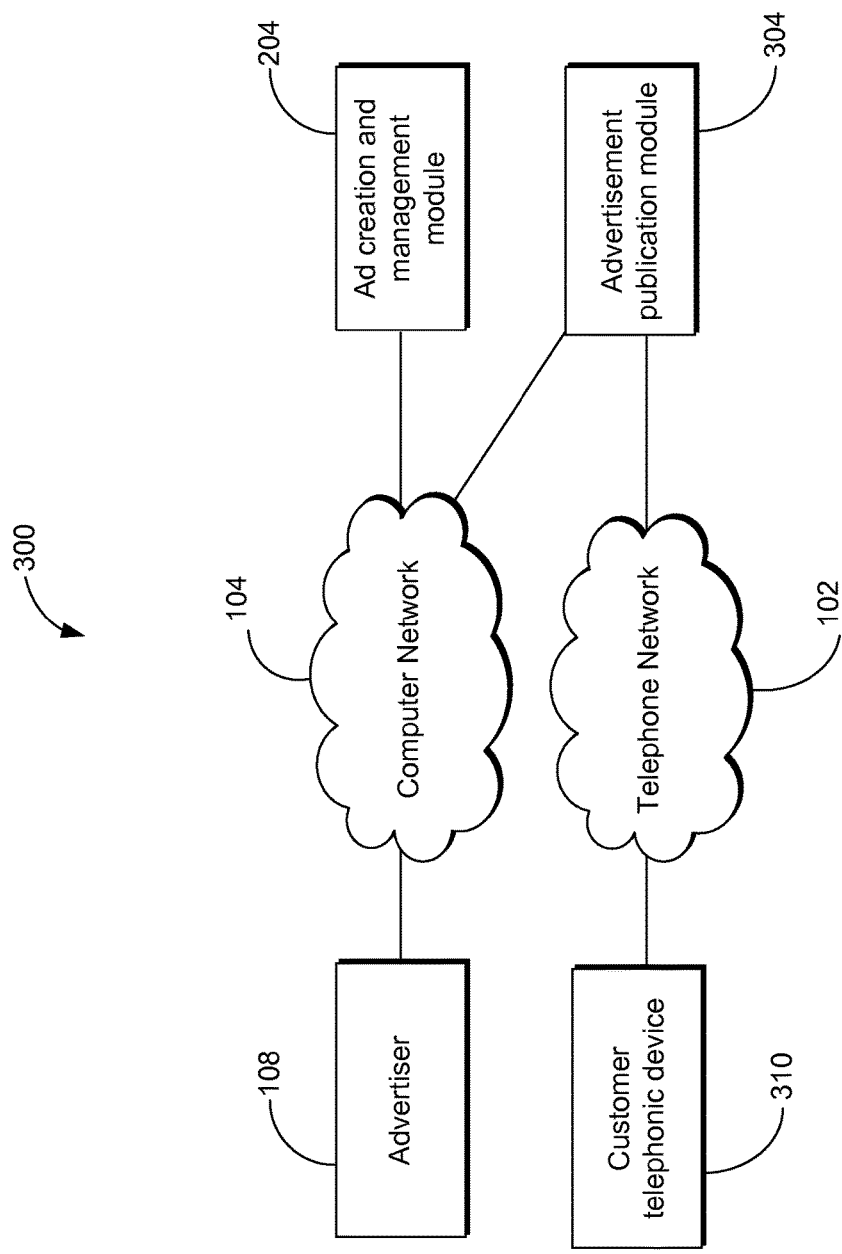
FIG. 3 illustrates a system for advertisement publication via a telephone network.

FIG. 3 illustrates a system for advertisement publication via a telephone network. As previously mentioned, the advertisement creation and management module 204 can be configured to create advertisements upon receiving a request from an advertiser 108 to create an advertisement for the advertiser 108. The advertisement creation and management module can further create advertisements based on text, audio or a mix of text and audio input such that an advertisement according to the advertiser's specifications is created. Accordingly, the advertisement can be created in text, in a short text message, in audio format, in a multimedia format, or any other format requested by an advertiser 108. Furthermore, the advertisement creation and management module 204 upon creating a proposed advertisement can request approval from the advertiser 108 for publication for the advertisement by an advertisement publication module 304. In addition, as previously mentioned, the advertiser 108 can request creation of an advertisement, conversion of an advertisement, or maintenance of an advertisement through the advertisement creation management module 204. The advertiser 108 can request the conversion of a text advertisement to an audio advertisement via a website provided by the advertisement creation management module 204. As such, the advertiser 108 can communicate with the advertisement processing service 112 discussed in FIG. 1 for processing of the advertisement according to the configuration and capabilities of the advertisement creation management module 204. The advertisement creation management module 204 can further reside in a stand alone computer, in a server or in any other computer device that can communicate with a computing device of the advertiser through a computer network 104. Furthermore, the advertisement publication module 304 can be configured to advertise advertisements that were created at the advertisement creation management module 204 via a telephone network 102.

The advertisement publication module 304 can be configured to assist a directory assistance infrastructure in order to provide advertisements during a directory assistance call. As such, the advertisements provided to directory assistance callers can be injected during a call with a customer calling from customer telephonic device 310. The customer telephonic device 310 can be a rotary dial telephone, cellular phone, a digital phone or a telephonic device integrated in a personal computer such as a desktop or a laptop or a personal data assistant (PDA), a smart phone, a cellular phone, a tablet PC or any other computer device they can have a telephonic device embedded therein. The advertisement publication module 304 can include logic to receive the advertisement from the advertisement creation and management module 204 and submit audio, video, text or image advertisements to the advertisement publication module 304. As such, the advertisement publication module 304 can be a component of the infrastructure of an advertisement delivery service 110. For example, the advertisement publication module 304 can be a component of an infrastructure of a directory assistance service.

In another example, the advertisement publication module 304 can be a component of a broadcast delivery system that can communicate an audio advertisement through a telephone network 102. Yet another embodiment, the advertisement publication module 304 can be part of a telemarketing entity that delivers audio advertisement through the telephone network 102 to one or more customers. Finally, the advertisement publication module 304 can be a component of an infrastructure of a demand partner of the advertisement processing service 112. A demand partner can be any advertisement delivery service that can deliver audio telephonic advertisements through the telephone network 102.

In one embodiment, the advertisements for an advertiser are provided to customers through different advertisements publication modules, via different communication media, such as web, instant messaging, short text message, interactive TV, internet TV, telephone, newspaper, magazine, radio, etc. An advertisement specified by an advertiser (e.g., in text via a web interface) can be used to generate different types of advertisements that are suitable for the presentation on different media channels. In one embodiment, the advertisement information supplied by the advertiser is abbreviated to generate an advertisement suitable for the advertisement distribution media. In one embodiment, the advertisements are presented on various media channels on behalf of an advertiser; and the advertiser is charged based on a price the advertiser bid for each telephone lead generated from the advertisements, regardless of the media channels used to generate the telephone lead. In one embodiment, the media channels that are responsible for generating the telephone leads are separately tracked; and the tracked information can be used to distribute revenue generated from the advertising and/or to improve the allocation of advertisements in different media channels.

Figure 4:
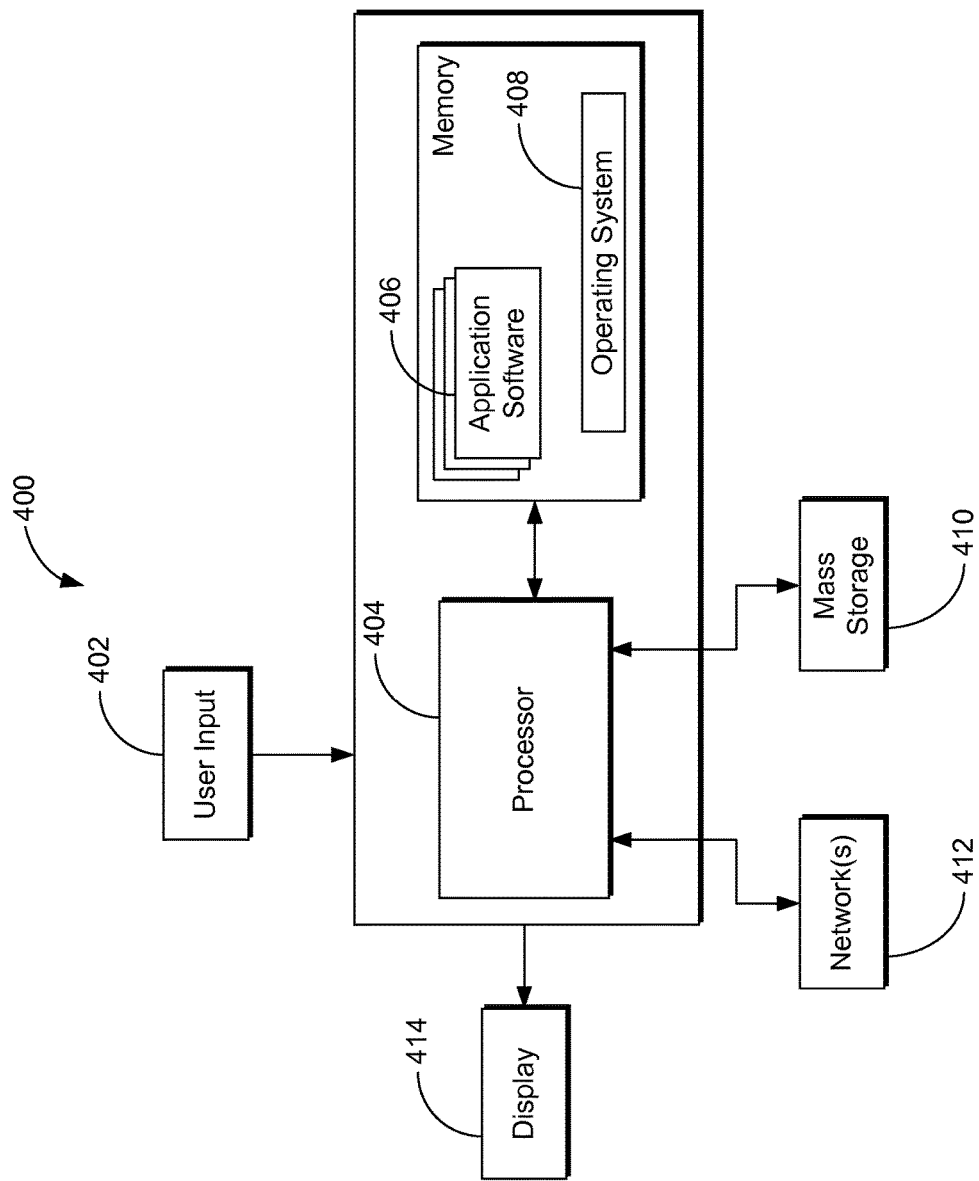
FIG. 4 illustrates a component diagram of hardware that can be used to implement one or more modules as described herein.

FIG. 4 illustrates a component diagram of hardware that can be used to implement one or more modules as described herein. The hardware 400 typically includes at least one processor 404 coupled to a memory 416. The processor 404 may represent one or more processors (e.g., microprocessors) and the memory 416 may represent random access memory (RAM) devices comprising a main storage of the hardware 400 as well as supplemental levels of memory, e.g., cache memories, nonvolatile or backup memories, read only memories, etc. In addition, the memory 416 may be considered to include memory storage physically located elsewhere in the hardware 400. The hardware 400 can also typically receive a number of impotent outputs for communicating information externally. For interface with a user or operator the hardware 400 may include one or more user input devices 402. The user input devices can include a keyboard, a mouse, etc. The hardware 400 can also include display devices 414 such as a cathode ray tube (CRT) monitor, a liquid crystal display LCD panel monitor, etc. For additional storage, the hardware 400 may also include one or more mass storage devices, such as a floppy or other removable disk drive, hard disk drive, optical drive (e.g., a compact disk), and a tape drive, among others. Furthermore, the hardware 400 may include an interface with one or more networks 412, such as a local area network, a wide network, a wide area network, a wireless network, a telephone network 102, a computer network 104, etc. The hardware 400 can operate under the control of an operating system 408 that executes various computer software applications 406 components, programs, objects, modules, etc. The application software stored in memory 416 can include application software that performs logic for any one of the modules described herein. For example, the application software can include software that can execute advertisement creation, advertisement management, advertisement publication and delivery, etc. The hardware 400, therefore, can be utilized for implementing the advertisement publication module 202, an advertisement publication module 304, a telephonic device 310, a customer computing device 310, and any other computing device or computing module disclosed herein.

Figure 5:
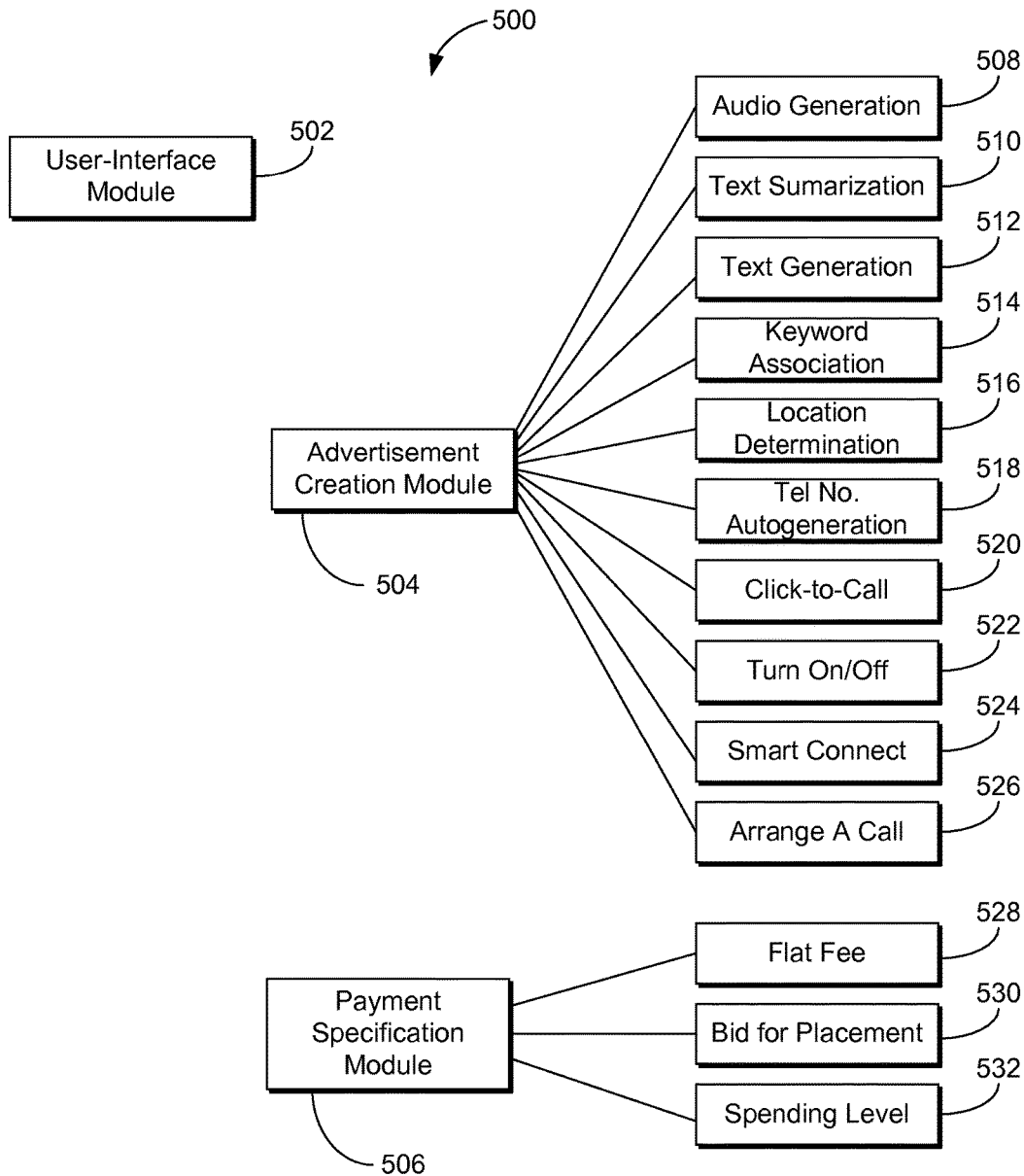
FIG. 5 illustrates internal components of the advertisement creation and management module.

FIG. 5 illustrates internal components of the advertisement creation and management module 500. The advertisement creation and management module 500 can include audio generation logic 508 associated with the advertisement creation module 504. The audio generation logic 508 permits the advertisement creation module 504 to create an audio advertisement from one or more text inputs provided by the advertiser 108.

In another embodiment, the audio generation logic 508 can create an audio advertisement based on any other input received from the advertiser 108 (e.g., checkboxes, coupon expiration date selection dropdowns, etc.). The advertisement audio generation logic 508 can also be configured with sound editing and production functions and operations in order to assist a user or operator to create an audio advertisement. For example, the advertisement audio generation logic 508 can be configured to provide recording functions such that the operator can record the audio advertisement.

In another embodiment, the advertisement audio generation logic 508 can be configured to allow the operator to select pre-recorded words to construct the audio recording. In another embodiment, the advertisement audio generation logic 508 can be configured to construct the audio advertisement by selecting pre-recorded words corresponding to words in a text advertisement. The words in the text advertisement can be obtained, in one example, from the text generation logic 512.

In yet another embodiment, the advertisement audio generation logic 508 can be configured to construct the audio advertisement by selecting pre-recorded words corresponding to words in an abbreviated text advertisement. The abbreviated text advertisement can be generated by a text summarization logic 510 discussed below.

The text generation logic 512 can also be included as part of the advertisement creation module 504. The text generation logic can permit an advertiser to input a text string. In one example, an advertiser can include text such as "Burt's Plumbing now offered in San Francisco—Check Out Our Special Deals." This text can be included in the advertisement when the advertisement is rendered and published for customer viewing.

The text summarization logic 510 can also be included as part of the advertisement creation module 504. Text summarization logic 510 can be configured to receive text as input and summarize the text by extracting key words that best represent the business, the type of services or any other words that the advertiser wants to stress.

Thus, text summarization logic 510 can include logic that extracts words in the language (e.g., English) that are most relevant and that are not connecting words, such as articles, but rather are words that convey meaning. For example, the text string "Burt's Plumbing now offered in San Francisco— Check Out Our Special Deals" can be summarized as "Burt's Plumbing in San Francisco, Special Deals."

In another example, the text summarization logic 510 can be configured to select relevant words and link the selected relevant words utilizing natural language processing algorithms that follow grammatical rules. For example, artificial intelligence techniques that manipulate language to render grammatically correct abbreviated sentences can be utilized. In addition, any heuristic model can be utilized. In one example, short sentences can be derived from a database of advertisement sales pitches. In another example, short sentences can be derived from a database of commonly used words in advertisement.

In one embodiment, once the text summarization logic 510 generates abbreviated text, the abbreviated text can be submitted to a quality check operator that reviews the generated abbreviated text for grammatical structure, semantic clarity, etc., such that the abbreviated text is both correct and persuasive. Alternatively, the abbreviated text can be presented to the advertiser for review. The machine generated summarization can be provided to the advertiser in response to input received from the advertiser without an extended waiting period. Thus, the machine generated summarization can be provided to the advertiser as a suggestion to generate an abbreviated version of the advertisement. The suggestion can be further modified by the advertiser and/or later reviewed by a human operator.

In yet another embodiment, the text summarization logic 510 provides functions and operations to an operator who performs the summarization. As such, the summarization of the text can be entirely performed by a human operator.

The advertisement creation module 504 can also include a key word association logic 514 that allows an advertiser to input certain key words which can be associated to the advertisement of the advertiser 108. The key words can, for example, be used for text summarization 510 or can also be used to provide the search engine in a web site of the advertisement publication module 202 such that customers can easily access and be presented with advertisements pertaining to advertiser 108.

Furthermore, a location determination logic 516 can also be provided with, or as part of, advertising creation module 504. The location determination logic 516 permits an advertiser that is not a national enterprise or a national operation such that advertisements are tailored to customers within a certain geographic area. As such, the location determination logic 516 permits an advertiser to select a particular geographic region, such as a state, city or a zip code area of interest, so that the advertiser 108 will have contacts from customers that are relevant in originating only from the area in which the advertiser 108 is located.

Furthermore, the advertisement creation module 504 can also include a telephone number auto generation logic 518 that automatically generates a unique telephone number. The telephone numbers can be SIP numbers for VoIP bases telephony, standard POTS (Plain Old Telephone Serivce) numbers with extensions, click-to-call references, etc. The unique number can further be mapped to the advertiser 108 such that when the unique number is called, the advertiser's 108 phone rings. In one embodiment, the standard POTS telephone numbers without extensions can also be assigned/mapped to advertisers/advertisements. In one embodiment, the telephone number that is automatically assigned can be a toll free number. In another embodiment, the telephone number can be a local number with the same area code of the advertiser 108 or the customer. In yet another embodiment, the telephone number can be an easily recognizable 800 number modified by a unique extension that is mapped to the advertiser 108. For example, the unique extension can be a word that expresses the type of service that the advertiser 108 provides. In one embodiment, the audio generation logic 508 can create and generate a speech or audio version of the telephone number such that an audio version of the telephone number can be used in conjunction or embedded in the audio advertisement created by the audio generation logic 508. Thus, in one embodiment, the advertisement creation module 504 automatically inserts the unique telephone number assigned to the advertiser 108 into an advertisement of the advertiser 108.

In another embodiment, the advertisement creation module 504 can be configured to create an advertisement that is in audio recognizable by a human being and that includes the telephone number of the advertiser 108. In addition, a click to call module 520 can be provided such that when invoked, the telephone number assigned to the advertiser 108 (or the advertisement) can automatically be called when the customer pushes a button. In one example, the button can be provided in a web page of an advertisement delivery service 110 or a web link of the advertisement delivery service 110.

In another embodiment, the button can be provided in connection with the telephonic device 310 of the customer such that the customer is prompted to input a key in the telephone keypad in order to be connected with the advertiser 108. For example, upon listening to the advertisement on the telephone, the customer can be prompted to "Press 1" if the customer 106 desires to be connected to the advertiser 108 automatically.

The advertisement creation module 504 can further include turn on/turn off logic 522 that allows an advertiser to turn off the injection of an advertisement or turn on the injection of an advertisement during a specific period. When an advertisement is turned off or flagged as inactive, the advertisement is considered withdrawn from an advertisement campaign. The advertiser 108 can turn on the advertisement again by flagging the advertisement as active. Only advertisements that are turned on or that have a status of active are published and delivered to customers according to the techniques disclosed herein.

The advertising creation module 504 can also include a smart connect logic 524. For example, the advertiser 108 can have a primary telephone number and one or more secondary telephone numbers associated with an advertisement. In one example, the smart connect logic 524 can first route the customer's call to the advertiser's primary telephone number. If no connection is achieved, then the list of secondary telephone numbers can be used by the smart connect logic 524 to connect to any one of the list of the secondary telephone numbers until a connection is achieved.

The advertisement creation module 504 can also include arrange a call logic 526. The arrange a call logic 526 permits a customer to input a time at which the customer wishes to speak with the advertiser 108. The advertiser can then be contacted to give the advertiser 108 an indication of the arranged call. The advertiser can be contacted in a variety of ways, including fax, mail, e-mail, telephone or any other communication means.

The advertisement creation and management module 500 can also include a payment specification module 506. The payment specification module 506 can be configured with flat fee logic 528, bid for placement logic 530 and spending level logic 532.

The payment specification module 506 can be configured by an advertiser 108 according to one or more parameters set by the advertiser 108. The flat fee logic 528 permits an advertiser to select flat fee billing for each telephone call received by a customer. Therefore, a flat fee can be applied for advertisements within a particular category. In another example, a flat fee basis can be applied for advertisements that are delivered within a certain period of time. In addition, a bid for placement logic 530 can allow an advertiser 108 to choose to be billed on a bid for placement basis. As such, the bid for placement logic 530 can support proxy bids and maximum/minimum bids. In one embodiment, a maximum bid can be specified; and the system automatically determines the lowest bid amount that is no more than the maximum bid and that is above bids from competitors.

The payroll specification module 506 can also include a spending level logic 532 that allows an advertiser to specify daily, weekly or monthly spending levels. As such, the specified spending level can be used by an advertiser to define a budget for a time period that advertiser 108 is willing to pay as a maximum. Therefore, an advertiser 108 can set a budget not to be exceeded within a time period and thereby better manage financial expenditures for advertising campaigns. In one embodiment, if the budget is exceeded within a particular time period, the advertisements or the flagged advertisement can be automatically turned off for the remainder of the time period. The advertiser 108 can further be notified that the spending level limit has been reached and be provided with an option to reactivate the advertisement or advertisements that have been deactivated.

In another embodiment, the payment specification module 506 can include logic to automatically waive charges for follow on calls. For example, if a customer calls on one day, and then later dials the same number to follow up on a call on the same day, the payment specification module 506 can be configured with logic to automatically waive the charge for the second call, since the second call has been already paid for.

Figure 6A:
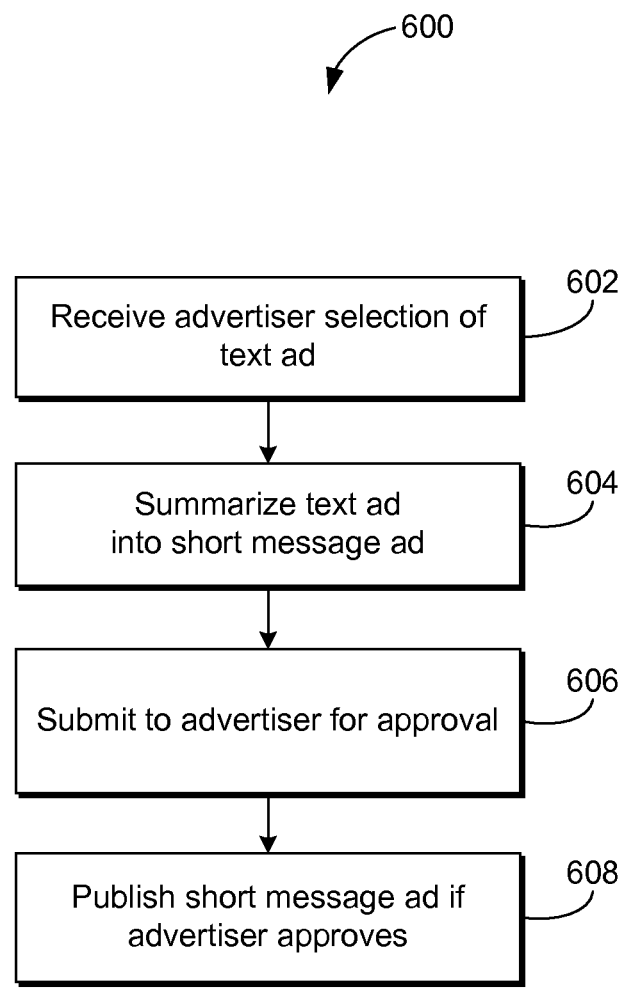
FIG. 6A illustrates a data flow diagram of a process for processing a visual advertisement.

FIG. 6A illustrates a flow chart diagram of a process 600 for processing a text advertisement. At process block 602, a selection of a text advertisement is received from an advertiser 108. The selection of the text can be made from existing text that has been previously configured and submitted to the advertisement processing service 112. In another example, newly submitted text from an advertiser can be utilized. The process 600 continues the process block 604.

At process block 604, the text advertisement is summarized into a short message advertisement. As previously mentioned, the text can be summarized into a short message advertisement by utilizing one or more known methodologies. For example, the text advertisement can be analyzed and meaningful words can be extracted from the text advertisement to form the short message advertisement. The meaningful words extracted from the text advertisement can be representative of the essence of the message that is intended to be advertised to a customer by the text advertisement.

Various summarization techniques can be utilized. In one example, relevant words can be selected from a text advertisement utilizing natural language processing algorithms that follow grammatical rules. In one example, short phrases or sentences can be obtained from a database of advertisement sales pitches. In another example, short phrases or sentences can be derived from a database of commonly used words in advertisement. In another example, summarized text can further be checked for quality by a quality check operator that reviews the generated abbreviated text for grammatical structure, semantic clarity, etc., such that the abbreviated text is both correct and persuasive. In yet another embodiment, an operator can manually summarize the text. The process 600 continues to process block 606.

In one embodiment, the abbreviated version of the advertisement is not only based on the text advertisement, but also based on other information related to or supplied from the advertiser. For example, web pages of the advertiser, comments of the advertiser for the abbreviated audio version of the advertisement, profile maintained by the system, history of the advertisements of the advertiser, etc., can also be considered in the generation of the abbreviated version of the advertisement.

At process block 606, the short message advertisement is submitted to the advertiser for approval. In one embodiment, the short message advertisement can be submitted to the advertiser through a computer network 104. For example, the short message advertisement can be submitted in an e-mail sent to the advertiser 108 for approval. In another embodiment, the short message advertisement is submitted for approval through a public telephone network and received by the advertiser 108 for approval. The process 600 continues to process block 608.

At process block 608, the short message advertisement can be published if the advertiser 108 has approved the short message advertisement. The advertiser can approve by acknowledging the submission of the short message advertisement and by transmitting a similar communication as the one received by the advertiser 108. In another embodiment, the advertiser can utilize any other communications media to communicate the advertiser's 108 approval or disapproval of the short message advertisement. The short message advertisement can be then published in one or more media as discussed above. For example, the short message advertisement can be published on a web page by a web server or by a wireless application server. In another embodiment, the short message advertisement can be published by a short messaging service center through a short message service format. Alternatively, the format can be a multi-media messaging service. In one embodiment, advertisements generated for presentation over different media channels are customized according to the characteristics of the corresponding media channels.

Figure 6B:
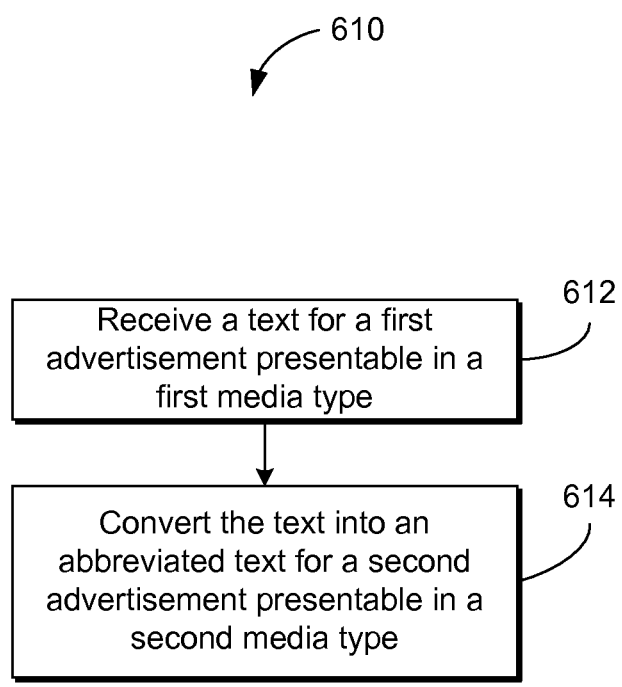
FIG. 6B illustrates a data flow diagram of a process for processing an abbreviated advertisement.

FIG. 6B illustrates a data flow diagram of a process 610 for processing an abbreviated advertisement. At process block 612, a text for a first advertisement presentable in a first media type is received. The text can be received from the advertiser 108. The process continues to process block 614. At process block 614, the text is converted into an abbreviated text for a second advertisement presentable in second media type. For example, an advertisement suitable for presentation during a short time window on an audio channel can be generated from a corresponding advertisement suitable for presentation on a web page (and optionally based on other information provided by the advertiser).

Figure 7:
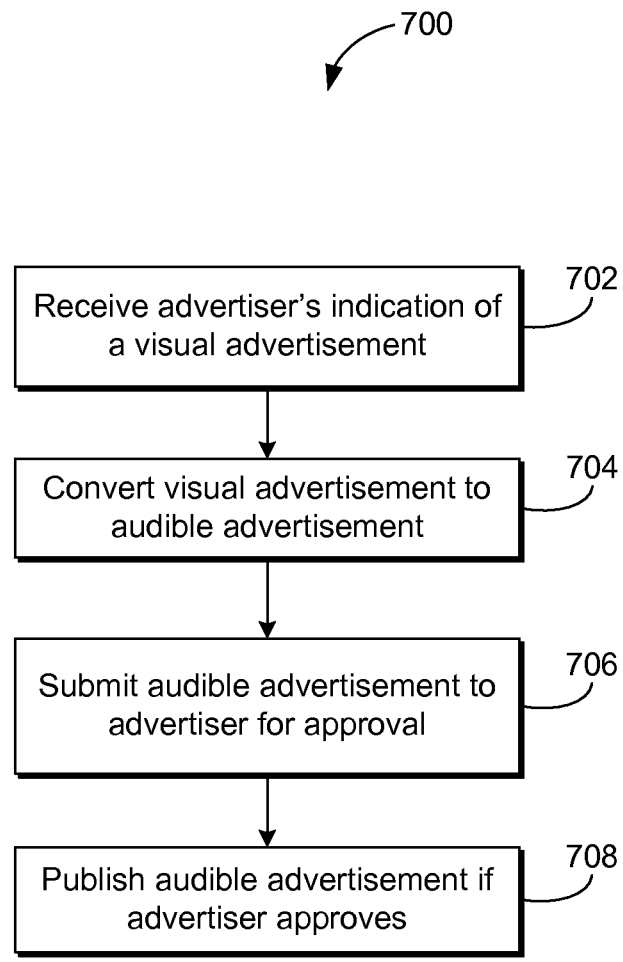
FIG. 7 illustrates a data flow diagram of a process for processing of an audio advertisement.

FIG. 7 illustrates a data flow diagram for a process 700 for processing of an audio advertisement. At process block 702, an advertiser selection of a text advertisement can be received and processed by the advertisement processing service 110. As mentioned earlier, the selection of the text advertisement can be made from a plurality of text as they have been previously submitted by the advertiser 108. In another example, the selection of the text advertisement can be provided in connection with a recently submitted text advertisement.

The process 700 continues to process block 704. At process block 704, the text advertisement is converted to an audio advertisement. The conversion logic can be one or more methodologies known in the art for converting text to speech. In one example, the converting logic can utilize summarization algorithms to extract meaningful words from the text advertisement and convert the words extracted from the text advertisement to speech. The converted words can then be concatenated into a single audio message that comprises the audio advertisement. In one embodiment, the generated audio advertisement is customized for an audio channel to have content that is less than and/or different from that of the text advertisement.

In another embodiment, the content of a visual advertisement can be converted into an audio advertisement. The conversion to audio can be performed utilizing various techniques. In one embodiment, the conversion is performed programmatically through a computer process that maps each word in the text advertisement and concatenates the spoken words into an audio message.

In yet another embodiment, the conversion is performed manually by an audio recording operator that receives the text from the advertiser 108 and records an audio advertisement. Having an audio recording operator can provide human input such that the audio advertisement is produced with a certainty that the audio advertisement will be understandable to customers. Human input can also provide the opportunity to create advertisement that is more compelling to customers.

Furthermore, text of the visual advertisement can be summarized by extracting meaningful words from the visual advertisement into a summarized text for advertisement. The summarized text for advertisement can then be converted into natural speech that conveys an audio advertisement message.

The advertisement text can be summarized such that relevant words in the advertisement text, or words similar to the relevant or operating words, are extracted and utilized for building the summarized text. Natural language processing algorithms that follow grammatical rules can be utilized to build the summarized text. For example, artificial intelligence techniques that manipulate language to render grammatically correct abbreviated sentences can be utilized. In addition, any heuristic model can be utilized. In another embodiment the conversion is performed programmatically through a computer process that can process natural language in order to replace one or more words with a shorter word or less number of words. For example, the computer process can be configured to receive the text "Contact our toll-free number" and replace that text with "Call" such that the advertisement "Contact our toll-free number 1-800-SERVICE" is summarized into "Call 1-800-SERVICE."

In another example, summarization is processed by a computer program and is manually checked by a human operator for grammatical structure, semantic clarity, etc., such that the abbreviated text is both correct and persuasive.

The process 700 continues to process block 706. At process block 706, the audio advertisement is submitted to the advertiser for approval. The audio advertisement can be submitted through the computer network 104 via e-mail or via any other TCP/IP network communication protocols, etc. In one embodiment, the advertiser can manage the advertisements over a web interface; and when available the audio advertisement can be download by the advertiser via the web interface for review and approval.

In one embodiment, once an advertiser 108 receives an advertisement for approval, the advertiser can be permitted to edit the advertisement and resubmit.

In another example, an advertiser 108 can be provided access to create multiple versions of an advertisement. In a further example, as part of advertisement editing, the advertiser 108 may be assisted by a customer service representative that interacts with the advertiser to further refine an advertisement. Preferably, the customer service representative can be a person with knowledge of summarization techniques, etc. The process 700 continues to process block 708.

Note that 706 can be optional. For example, in one embodiment, the advertiser may have approved it up front so that no further approval is needed. In one embodiment, the advertiser can reject or stop the automatically approved advertisement without having to explicitly approve the advertisement before the deployment of the advertisement.

At process block 708, the audio advertisement is published once the advertiser 108 approves. In one embodiment, the advertiser 108 approves the audio advertisement by listening to the audio advertisement at a customer computing device 210 equipped to output audio.

Figure 8:
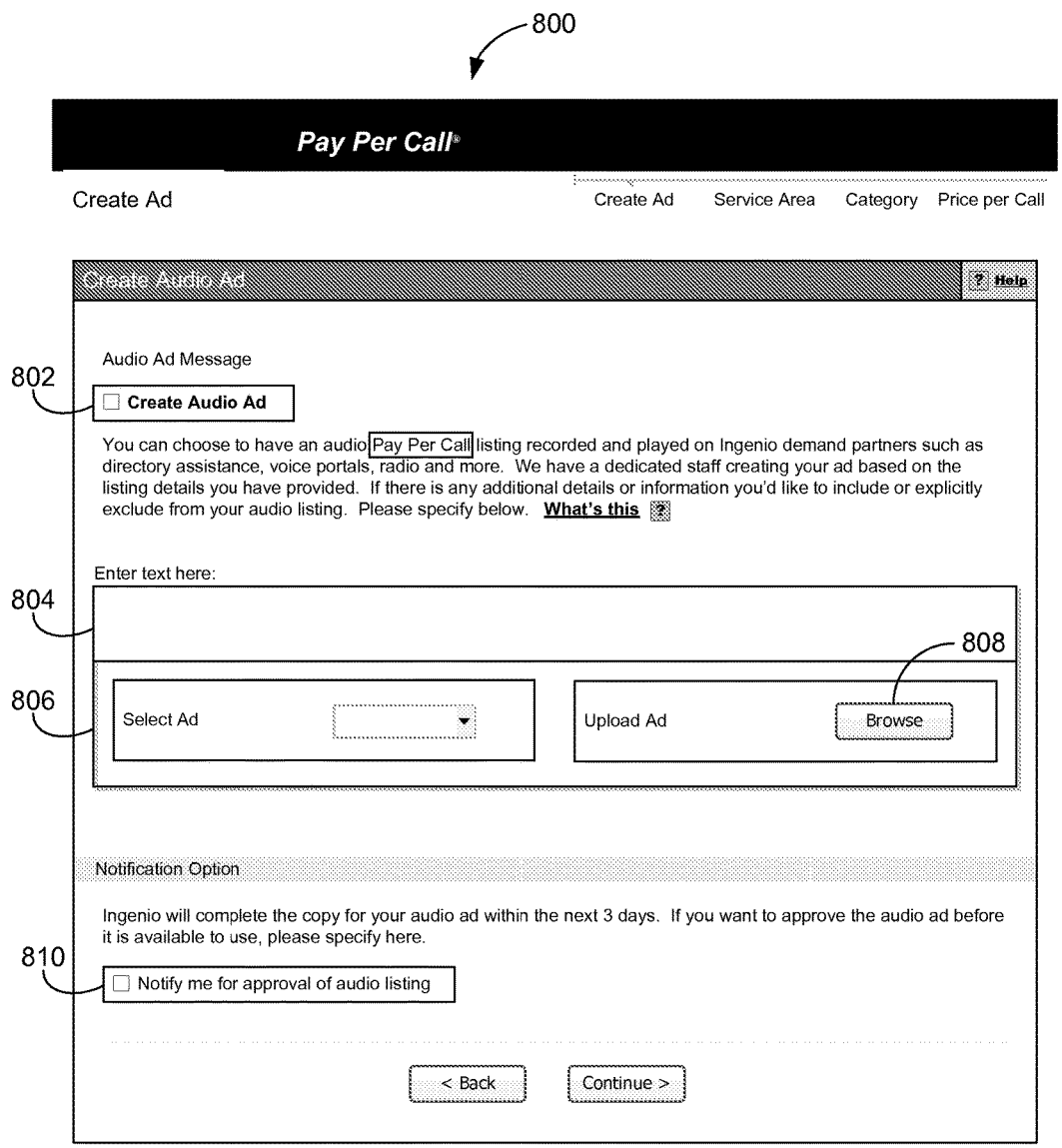
FIG. 8 illustrates a screen shot of a user interface for permitting an advertiser to select the creation of an audio advertisement.

FIG. 8 illustrates a screen shot of a user interface for permitting an advertiser to select the creation of an audio advertisement. The user interface 800 can provide an audio advertisement selection input 802. In one embodiment, the audio advertisement selection input 802 is a check box. In another embodiment, the audio advertisement election in 102 can be a button or any other user interface, which can be selected when the advertiser 108 desires to create an audio advertisement based on some text.

In addition, the user interface 800 can provide a text field 804 such that the advertiser 108 can enter text into text field 804, which is to be converted into audio, or to provide comments or suggestions that are to be considered in the generation of the audio advertisement. Alternatively, the user interface 800 can also provide a drop down menu 806 that lists all the previously submitted text advertisements submitted by an advertiser 108 such that when selected, one of the menu items of the drop down box 806, the selected item, can be converted to, or used in a conversion to, an audio advertisement.

In another example, a browse option 808 can be provided such that the advertiser 108 can upload an advertisement that the advertiser 108 wants to convert to an audio advertisement. Thus, the advertiser 108 can provide an image, a video and audio file, text file, or any other recognizable file format that can then be processed by the advertisement creation and management module 204 in order to create the audio advertisement. In addition, operators and computer software engineers and managers can be utilized by the advertisement processing service 112 to process the file submitted by the advertiser 108 and convert the file or the information in the file into an audio advertisement.

In addition, a notification input 810 can be provided as part of the user interface 800. The notification input can be a check box, a radio button, a drop down menu, a single button, or any other input that can be utilized by the advertiser to select that a notification be sent to the advertiser for approval. If the notification input 810 is selected by the advertiser 108, the advertiser 108 will be notified (e.g., via email, telephone, instant messaging, short text message, etc.) when the audio advertisement is ready for review and approval by the advertiser 108.

Figure 9:
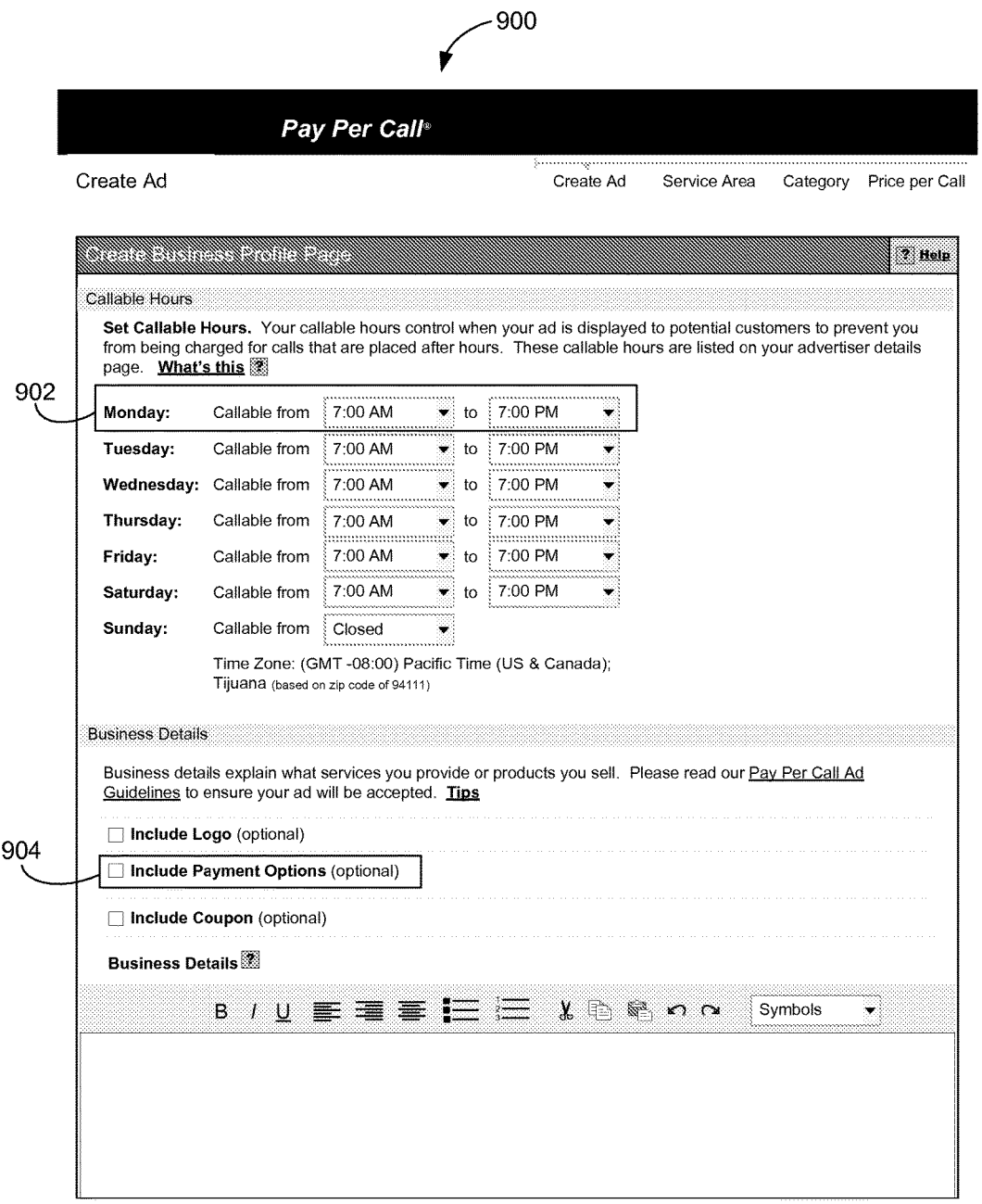
FIG. 9 illustrates a screen shot of a user interface for setting callable hours and payment options.

FIG. 9 illustrates a screen shot of a user interface for setting callable hours and payment options. A callable hour input 902 can include one or more drop down menus that permit an advertiser 108 to set a period of time at which the advertisements can be delivered to customers. For example, the advertiser 108 has hours of operation from 8:00 to 5:00 p.m., Monday through Friday, and the advertiser 108 wants to advertise only during the business hours such that any calls from a customer are then made during the hours of operation. In another example, the advertiser may want to deliver advertisement at times at which advertisement is proper depending on the business type of the advertiser. For example, breakfast advertisements are more appropriate to be delivered during the morning. As such, the callable period input 702 can be provided with drop down menus for selecting a starting time and an ending time within a day. In another embodiment, other time periods can be specified. For example, a time period of Monday through Friday can be set for advertisement delivery.

In addition, a payment input 904 can be provided in the user interface 900 for providing payment options. For example, payment options acceptable to the advertiser for services and goods can be specified.

Figure 10:
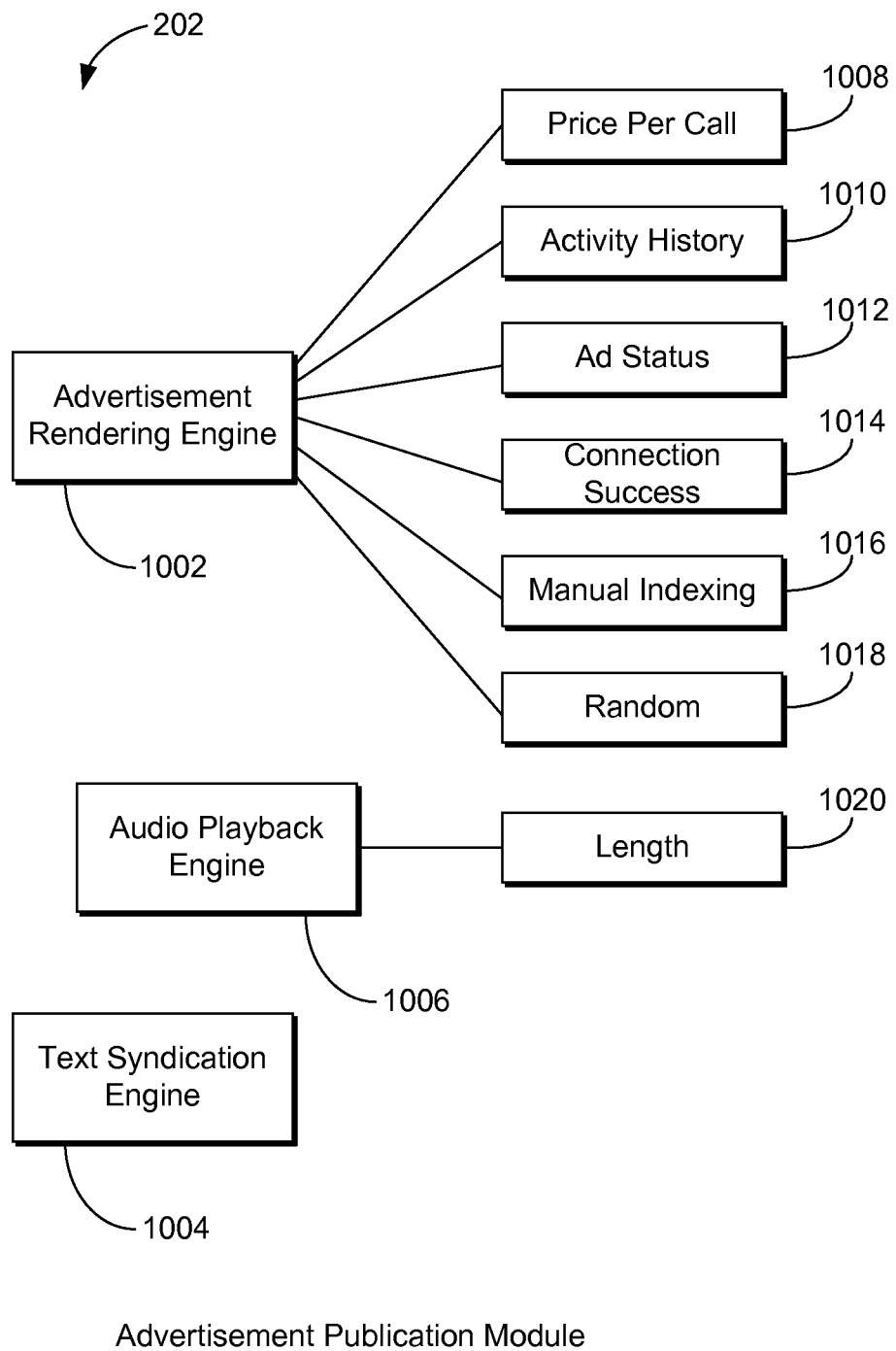
FIG. 10 illustrates the components of an advertisement publication module.

FIG. 10 illustrates the components of an advertisement publication module. The advertisement publication module 202, for example, can include an advertisement rendering engine 1002 and a syndication engine 1004. In addition, the advertisement publication module can also include an audio playback engine 1006.

The advertisement rendering engine 1002 can be configured to automatically render the advertiser's advertisement through a particular channel. In one embodiment, the advertisement rendering engine can be associated with a campaign management interface displayed to an advertiser 108; and the campaign management interface can be used to receive the advertiser input related to the types of media channels utilized to deliver the advertisements of the advertiser 108.

A price per call logic 1008 can be included as part of the advertisement rendering engine 1002. The price per call logic 1008 permits an advertiser 108 to bid for advertisement prices such that the higher the price of the advertisement, the more visibility the advertisement will have, and further, the lower the price per call of the advertisement, the less visibility that the advertisement will have. This provides an advertiser 108 the flexibility of configuring the visibility of advertisements depending on the interest that the advertiser 108 wants to obtain in specific products or services that the advertiser 108 offers.

In one example, the advertiser can bid for a $3.00 advertisement such that if a customer calls the number indicated in the advertisement, the advertiser will be charged $3.00 for the customer's call. However, the advertiser can increase the visibility of the same advertisement by bidding to pay $5.00 for each customer that calls the number associated with that advertisement. In addition, where one or more advertisers compete for a specific spot for advertisement delivery, the higher bidding advertiser will win and have the advertisement delivered to the customer prevailing over the other advertisers. Thus, for example, if three advertisers are competing for a space on an Internet web site and the three advertisements are appropriate to be placed in such Internet web site according to the content of the web site, or as the result of a search or request by phone etc., the highest bid advertiser will be the winner. Thus, the advertisement corresponding to such advertiser will be placed in the available space in the web site.

The advertisement rendering engine 1002 further includes an activity history logic 1010 that analyzes the number of calls that an advertiser 108 has received during a time period. For example, the number of calls during a specific day can be analyzed and be provided to the advertiser 108. In another example, the number of calls received during a month can be provided to the advertiser 108. In addition, the number of calls for a specific advertisement in relation to a specific period can also be provided.

Furthermore, advertisement status logic 1012 can be provided as part of an advertisement rendering engine 1002. The advertisement status 1012 logic can permit an advertiser to examine the status of a specific advertisement and bid for delivery during specific times. The connection success rate 1014 can be configured to measure the connection success rate for calls to the telephone number assigned to the advertiser 108 for a specific advertisement. The connection success logic 1014 can further rank advertisements of the advertiser 108 within a display page based on the connection success rate.

In one embodiment, the conversion rate (e.g., the rate of calls received via an advertisement to presentations of the advertisement) is estimated or determined for the ranking of advertisements in a display page. For example, an advertisement that is displayed 10 times and called 5 times (and generating pay per call charges each time) has a higher conversion rate than an advertisement that is displayed 10 times and called 3 times. In one embodiment, the conversion rate is used to estimate the expected revenue from the presentation of the advertisement. For example, if the advertisement that is called 3 times for every 10 presentations is paying more per call, it might still be ranked higher than the advertisement that is called 3 times for every 10 presentations. For example, if the advertisement that is called 3 times for every 10 presentations and the price per call is $1.00 for this advertisement, it can be expected that a presentation of the advertisement would bring in an income of $0.30 in average. Given equal bid prices the advertisement that has a higher conversion rate can generate from advertisement income. In one embodiment, the expected revenue can further include other types of income generated from the advertisement. For example, if a commission is charged based upon a transaction resulted from the advertisement, the expected commission can also be estimated and used in the determination of the expected revenue for the presentation of the advertisement.

In another embodiment, a manual indexing logic 1014 can be provided as part of the advertisement rendering engine 1002 and permits an operator to manually index or rank advertisements within a specific publication page. The manual indexing 1014 permits an advertiser 108 to have higher and greater control over how advertisements of the advertiser 108 are displayed and delivered to a customer. Alternatively, a random logic 1018 can be utilized by an advertiser to select advertisements that should be delivered randomly and without a particular index or order as the advertisement would under the manual indexing logic 1014.

Furthermore, the advertisement publication module can include a syndication engine 1004 that can be used to syndicate advertisements of the advertiser 108 to a number of third parties that host publication channels selected by the advertiser. In one embodiment, the syndication engine 104 can be configured to syndicate the advertisement to internet search engines and/or internet yellow page. In yet another embodiment, the syndication engine 1004 can syndicate advertisements to online directories and other media. Finally, the syndication engine 1004 can syndicate advertisements to wireless devices and telephone devices as described previously.

The advertisement publication module can also include an audio playback engine 1006 that can be utilized to deliver audio ads. The audio playback engine can include logic to syndicate or stream audio to a computing device or a telephonic device of the customer such that the customer can then receive the audio advertisement via the customer computing device 210. In addition, the audio playback engine 1006 can work and be configured to render an audio advertisement simultaneously with a text advertisement that a syndication engine 1004 is providing. The text syndication engine 1004 can, for example, display on a web page a text or an image advertisement, and in addition, an audio playback of the audio advertisement can be rendered by the audio playback engine 1006 simultaneously.

Figure 11:
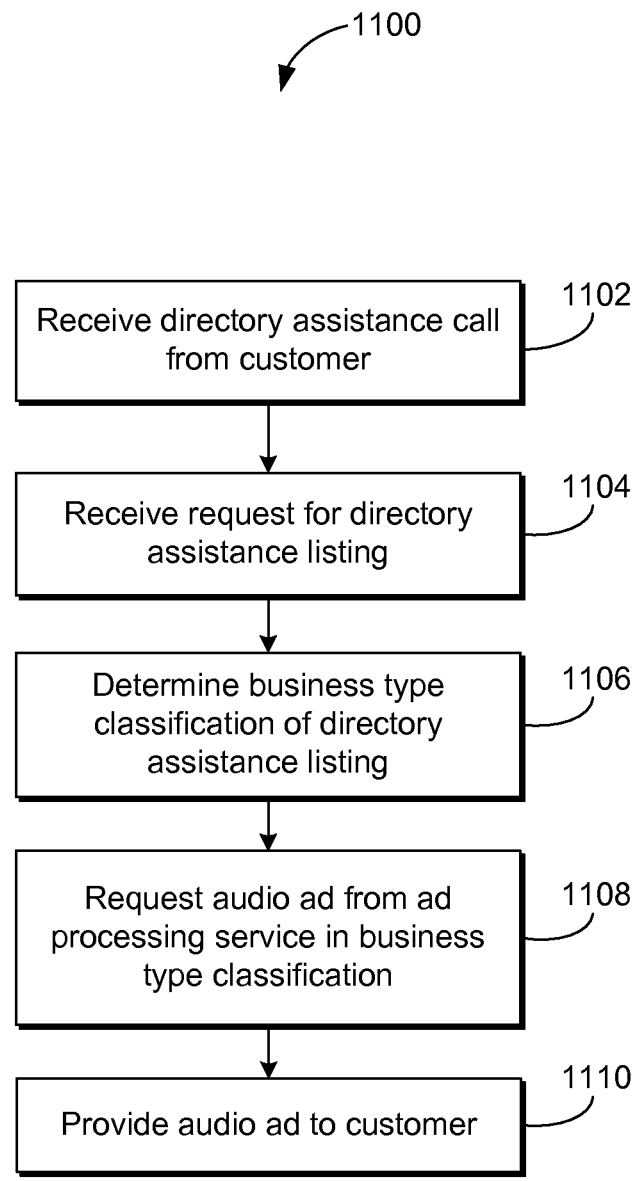
FIG. 11 illustrates a process for delivering an audio advertisement to a customer of a directory assistance service.

FIG. 11 illustrates a process for delivering an audio advertisement to a customer of a directory assistance service. By way of example, a directory assistance service can be utilized as the advertisement delivery service 110. At process block 1102, a directory assistance call is received from a customer and processed. The process 1100 continues to process block 1104.

At process block 1104, the customer request for a directory assistance listing is received via an automated voice recognition system or through a live operator. The process 1100 continues to process block 1106.

At process block 1106, the business type classification of the directory assistance listing requested by the customer is determined. For example, if the customer requests the name of an airline company, the business type can be air transportation services. The process 1100 continues to process block 1108.

At process block 1108, an audio advertisement can be requested from the advertisement processing service 112. The audio advertisement requested can be specified to be within the business type classification previously identified. If the advertisement processing service 112 identifies an audio advertisement within the type of business classification requested, the advertisement processing service can transmit the audio advertisement to the advertisement delivery service 110 to be delivered to the customer because in this example the advertisement delivery service 110 is the directory assistance service. The directory assistance service can query the customer to select whether or not the customer wants to listen to the audio advertisement or not. In one embodiment, the customer may be given the option to listen to the audio and not be charged for the directory assistance call. In one embodiment, the directory assistance call is free to the customer, even if the customer does not choose to listen to audio advertisements. In one embodiment, at least one audio advertisement is presented to the customer to support the directory assistance call service that is free to the customer. For example, after the operator receives the directory assistance request, a short audio advertisement can be played, while the operator is working on the directory assistance request and/or before the operator provides the result.

In another embodiment, the advertisement delivery service 110, such as the directory assistance service, can have a local database of advertisements that can be utilized to deliver to the customer. Upon identifying the business type related to the customer request, the advertisement delivery service 110 retrieves the advertisement from the local database.

In another embodiment, the audio advertisement requested can be based on "switch pitching." Switch pitching generally refers to suggesting or recommending a supplementary or substitute service or product to the service or product requested by the caller. For example, if the customer requests car rental service, a supplementary service can be hotel services. In another example, if the customer requests a listing for a real estate agent, a supplementary service can be a mortgage company. In another example, if the customer requests a listing for an Italian food restaurant, a substitute service can be another Italian food restaurant or a Greek food restaurant. Thus, switch pitching can be utilized when the audio advertisement presented to the customer corresponds to supplementary or substitute services to those products or services originally requested by the customer. The advertisement can be retrieved from the local database as discussed above or from a database accessible to the advertisement processing service 112. The process 1100 can continue to process block 1110.

At process block 1110, the audio advertisement is provided to the customer. In one embodiment, the advertiser is charged for the advertisement if the customer is connected to the advertiser via the audio advertisement. In one embodiment, the advertiser is charged a price based on a per call price bid specified by the advertiser. The per call price bids from the advertisers can be used to select an advertisement for the customer. Further, the selection can be made based on other information, such as the category of business that the customer is seeking via the directory assistance call, relation to the business that the customer is interested in, budgets of the advertisers, and/or the conversion rate of the advertisement, etc.

The customer can be connected to the advertiser through forwarding or bridging the call (e.g., the directory assistance call during which the advertisement has been delivered to the customer) to the advertiser. For example, the call can be directly forwarded to the advertiser, after the telephone number of the advertiser is determined. Alternatively, a separate call to the advertiser is established; and the call from the customer and the separate call to the advertiser are joined to connected advertiser and the customer. Alternatively, the call can be forwarded to a telephone number that is assigned to the advertiser and used to track the phone connections made to the advertiser via the audio advertisement; and the system that receives the forwarded call can further connect the call to the advertiser (e.g., through forwarding or through making a separate call to the advertiser and then join/conference the calls). Alternatively, a phone number that is assigned to advertiser and that is used to tracked the calls to the advertiser can be provided to the customer via the advertisement, enabling the customer to make a call to the advertiser subsequently, separately from the directory assistance call. Alternatively or in combination, other communication references, such as a hyperlink, can be delivered to the customer (e.g., in response to the customer's selection of the advertisement and/or the customer's preference); and the communication references can be used subsequently to request a connection to the advertiser.

Figure 12:
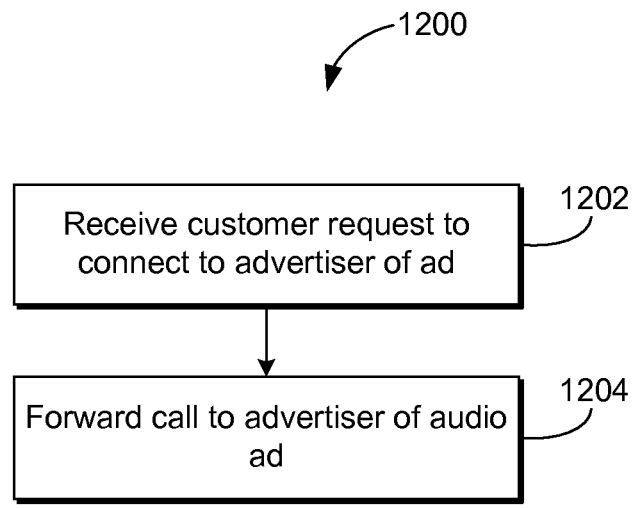
FIG. 12 illustrates a data flow diagram for a process for forwarding a call to an advertiser of an audio advertisement.

FIG. 12 illustrates a flow chart diagram for a process 1200 for forwarding a call to an advertiser of an audio advertisement. At process block 1202, a customer request to connect to an advertiser of an audio advertisement is received. For example, once the audio advertisement is presented and played back to the customer during a directory assistance call or during any communication connection with the customer, the customer can request to be connected to the advertiser of the audio advertisement. Thus, the advertisement publication module 202 can be configured to transfer the call to a telephone number associated with the audio advertisement. The telephone number may also be presented to the customer in the audio advertisement in one embodiment. In one example, if the customer is in a telephone call with an operator of a directory assistance service, the directory assistance service operator can be provided with access to the telephone number of the advertiser 108. In one embodiment, the telephone number of the advertiser 108 that the directory assistance operator has access to is an assigned telephone number that connects to a call handling center before being connected to the advertiser 108 such that the call can be tracked to determine the calls generated for the advertiser from the advertisement. An example of the call-handling center is the advertisement processing service.

In one embodiment, the telephone number of the advertiser 108 that the directory assistance operator has access to is the telephone number of the advertiser which connects directly to the advertiser. In this case, the operator of the directory assistance service, or an automated system of the directory assistance service connecting the call to the advertiser 108, makes a record of the connection for purposes determining the calls generated for the advertiser from the advertisement. The process 1200 continues to process block

1204. At process block 1204, the call is forwarded to the advertiser of the audio advertisement.

Figure 13:
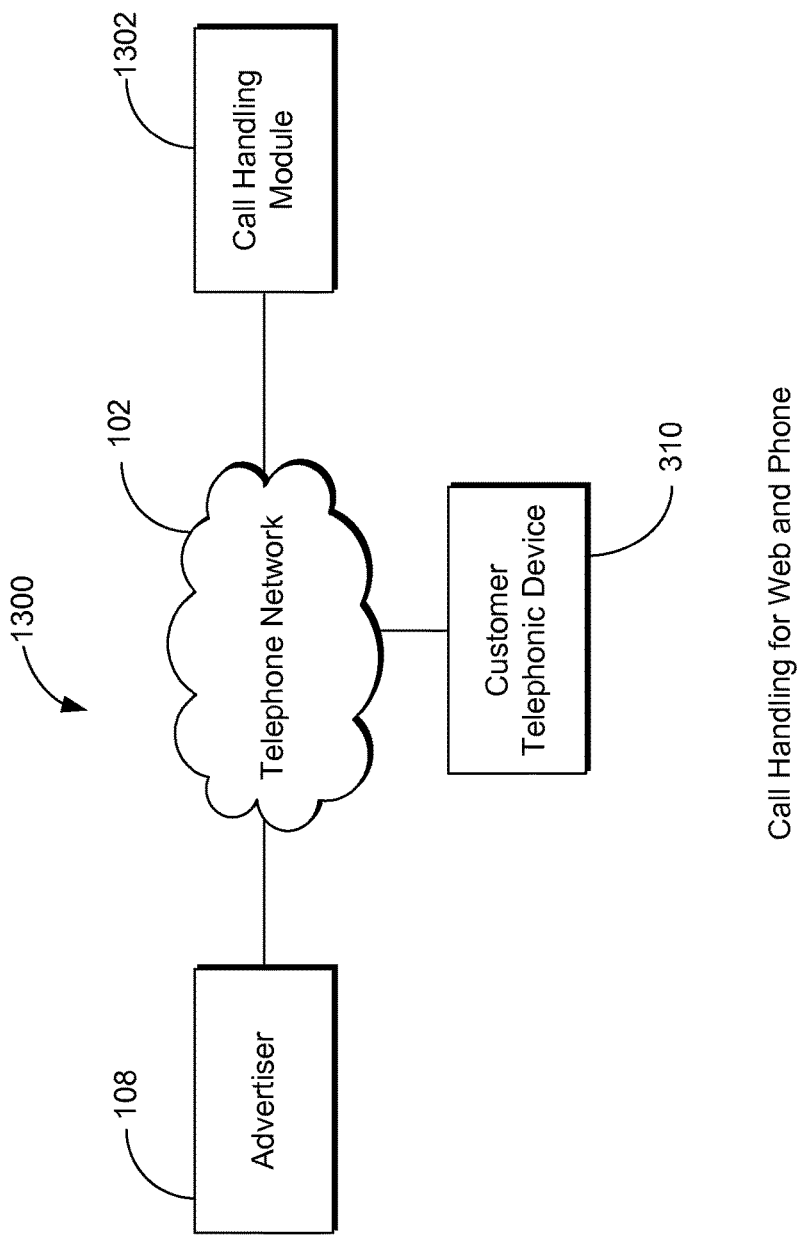
FIG. 13 illustrates a system for handling a call from a customer in response to an advertisement.

FIG. 13 illustrates a system 1300 for handling a call from a customer in response to an advertisement. As previously explained, the telephone numbers that are assigned to advertisers and included in the advertisements for the corresponding advertisers can be aliases or in other words, surrogate numbers that are utilized for advertisement and tracking purposes. These telephone numbers may further include extensions that can be used to differentiate the advertisers, advertisements, and/or media channels that are used to deliver the corresponding advertisements. When the customer dials the surrogate number that has been assigned to an advertiser 108 the call is received at a call handling module 1302. The call handling module 1302 can be part of the infrastructure of an advertisement delivery service 110 or the advertisement processing service 112 such that, when the customer makes a telephone call to the surrogate number using the customer's telephonic device 310, the telephone call is routed to the call handling module 1302. Upon receiving the call at the call handling module 1302 the corresponding advertiser 108 is determined based on the surrogate number dialed. The call is then forwarded from the call handling module 1302 to the advertiser 108, or joined with a separate call made from the call handling module 1302 to the advertiser 108, to connect the customer to the advertiser 108. When the telephone connection between the customer and the advertiser is established, a record is generated to indicate the phone lead generated by the advertisement on behalf of the advertiser and/or the per call price bid of the advertiser. In one embodiment, the per call price bid can be changed by the advertiser (e.g., via a management tool provided using a web interface). For a phone lead generated from the advertisement, the advertiser is charged the per call price bid that is effective at the time of the phone connection. Alternatively, the surrogate number can also be used to track the per call price bid at the time the advertisement is delivered; and the advertiser is charged the per call price bid that is effective at the time of the delivery of the advertisement. In one embodiment, the advertiser can specify a maximum bid; and the system automatically determines the lowest bid for the advertiser, under the limit of the maximum bid, according to the bids of the competitors of the advertiser. Alternatively, a per call price bid is adjustable after a system specified period of time (e.g., one day, or one hour) to limit how frequent an advertiser can the per call price bid.

Figure 14:
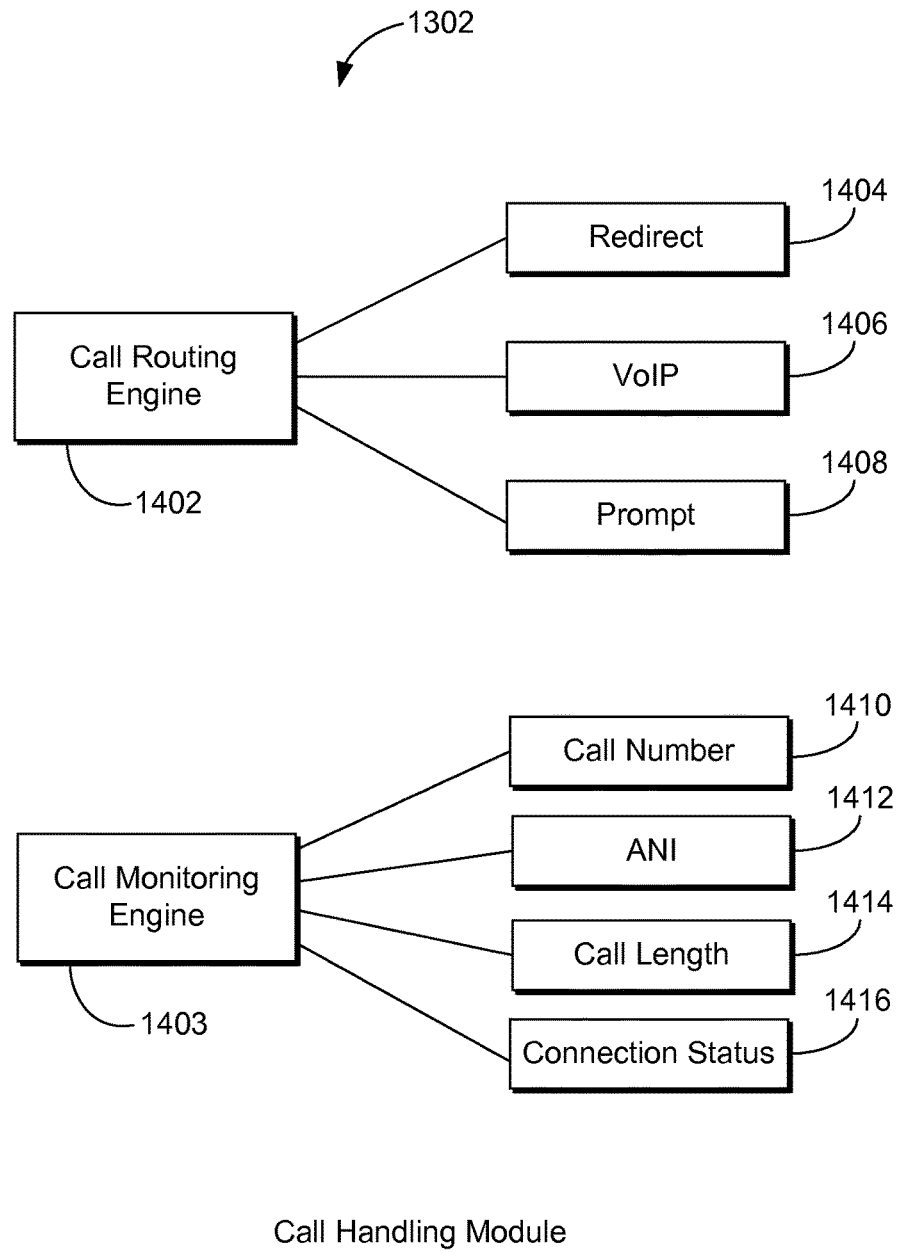
FIG. 14 illustrates the components of the call handling module.

FIG. 14 illustrates the components of the call handling module 1302. The call handling module 1302 can include a call routing engine 1402 and a call monitoring engine 1403. The call routing engine 1402 can include redirect logic 1404 to cause redirection of a telephone call to the telephone number assigned to the advertiser. The call can be redirected or forwarded to a telephone number specified by the advertiser 108 during the creation of the advertisement. The call routing engine 1402 can also include VoIP logic 1406 to route a telephone call to or from an advertiser based on the telephone number specified by the advertiser using VoIP technology. Furthermore, the call routing engine can also include prompt logic 1408 that can permit a prompt to be played to a caller before routing the telephone call to the advertiser 108. In one embodiment, the prompt can provide the advertiser's 108 actual telephone number so that the customer can, in the future, make calls directly to the advertiser's telephone number. In addition, the prompt logic 1408 can also be utilized to provide information to the advertiser 108 when the phone call is connected to the advertiser. For example, the information played as an audio to the advertiser 108 can be the source of the telephone call i.e., the telephone number of the customer. In another embodiment, the prompt logic 1408 can provide the telephone number of the customer as data and not as an audio message during the call. In other embodiments, the prompt logic 1408 can permit an email, facsimile or any other message in any communication format to be transmitted to the advertiser with information regarding the customer. The call monitoring engine 1403 can include call number logic 1410 to record the number of calls generated in response to the advertiser's 108 ads. In addition, the call monitoring engine 1403 can also include automatic number identification (ANI) logic 1401 to identify the number of the customer calling the advertiser 108. The call monitoring engine 1403 can further include call length logic 1414 that monitors the length of the call to the advertiser. In one example, the length of the call can be utilized to charge an additional fee to the advertiser if the length of the call surpasses a threshold amount of time. In one embodiment the call length can be utilized to not charge for short calls as they might not be considered valuable leads. In addition, the connection status logic 1406, also included as part of the call monitoring engine 1403, can detect the successful connection of the call from the customer to the advertiser 108.

In one embodiment, the advertisement publication module may publish the advertisement on a telephone based advertising service. For example, the advertisement can be delivered to a customer through audio as part of a voice portal or telephone based directory, such as a 411 telephone directory. In another embodiment, the advertisement publication module may publish the advertisement on a web based advertising service. For example, the advertisement can be delivered to a customer through a streaming website that provides audio through the website using voice over IP technology. In another embodiment, the advertisement publication module may publish the advertisement on a web based advertising service that is delivered to a portable device. For example, the advertisement can be delivered to a customer through a website as a text advertisement. In yet another example, the advertising publication module may publish the advertisement on a web page advertising service. For instance, the advertisement can be delivered to a customer through a portable device using a text messaging service that delivers a text message that was abbreviated by the advertisement creation and management module.

Figure 15:
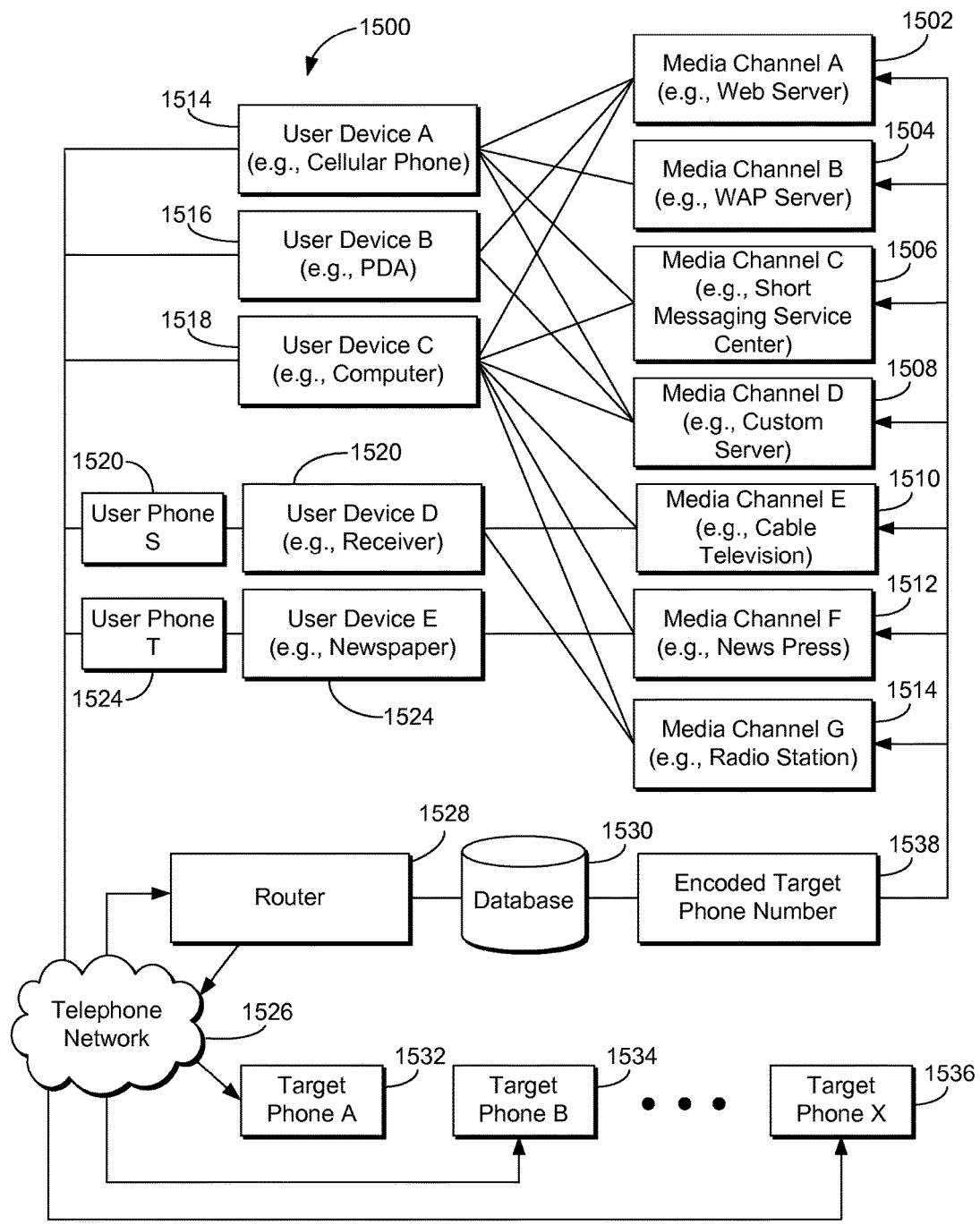
FIG. 15 illustrates a system for call handling.

FIG. 15 illustrates a system for call handling. The customer initiates a phone call. Alternatively, a phone router 1528 may be used to initiate phone calls both to the telephonic device 310 (or a separate user phone) and the target phone 1532. The router 1528 can then connect the call to the target phone. For example, when the customer selects the encoded target phone number 1538, the selection of the target phone number 1538 is transmitted to the phone router 1528. Thus, the phone router 1528 can be utilized by a directory assistance infrastructure to route customer calls to advertiser telephone numbers.

The customer phone number can be automatically determined through ANI, or through a user preference setting, or through an entry submitted with the selection of the encoded target phone number. The user, media channel and other useful information can also be identified as a unique user, media channel etc., or at least a unique "device or application" by passing a unique user ID, and Channel ID as parameters of a SIP initiated call.

In one embodiment, the selection of the encoded target phone number 1538 is transmitted to a corresponding media channel, which forwards the request for making the phone call to a server (e.g., a web server) connected to the phone router 1528. Alternatively, the content information can be formatted so that the selection is sent directly to the server that is connected to the phone router 1528.

When the router 1528 starts the phone calls, the encoded target phone number can also include alphabetic characters (and/or other characters). The server and/or the phone router 1528 can decode the encoded target phone number 1538 to recover/retrieve the target phone number 1538 and other associated information, such as the identity of the media channel that is creditable for providing the encoded target phone number to user. Exemplary media channels are a web server 1502, a WAP server 1504, an SMS center 1506, a custom server 1508, a cable television channel 1510, a news press article 1512, a radio station 1514, etc.

In one embodiment, an advertisement is presented to end users around the globe without geographic area limitations. For example, an advertiser may provide services and/or products to customers around the globe. The advertisement may be delivered to the worldwide users of the Internet.

In one embodiment, the intended audience of an advertisement is the population in a particular geographic area or people interested in a particular geographic area. For example, an advertiser may limit its service area within a geographic area, where the advertiser can provide services and/or products to the customers more effectively. For example, a business may better serve the customers within a convenient walking/driving distance to the site of the business. A business may limit the service area within a city, a state, a country, or other types of regional areas. Further, a large business entity having offices around the world may want to attract customers in different geographical regions to different offices for better services.

In one embodiment, an advertisement presented in a media channel is for a single advertiser. The customer selects an advertiser according to the advertisements presented on behalf of individual advertisers. The phone decoder and router 1528 connect the customer and the selected advertiser according to the encoded target phone number 1536 individually publicized in the advertisement for the advertiser. When the customer views the online advertisements, the selection of the advertiser is based on the online information. When the customer listens to audio advertisements, the selection of the advertiser is based on the recorded information.

In one embodiment, an advertisement is presented in a media channel for a group of advertisers, such as a group of mortgage brokers. The advertisement contains an encoded target phone number 1536 which is reachable to the group of mortgage brokers. When the encoded target phone number 1536 is selected or used, the selection of a particular advertiser is performed at the phone decoder and router 1528.

For example, a toll-free number is published to advertise mortgage brokers in a particular geographic area. When a consumer dials the toll-free number, the call is routed to the highest bidding mortgage broker who is available in that market.

The phone decoder and router 1528 may select the target advertiser according to the bidding of the advertisers for the advertisement. The advertiser who places the highest bid is the winner for the call. Alternative, or in combination, other types of selection criteria can also be used. For example, the user may be interested in advertisers in a particular geographical region; and the geographic area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, conversion rate, average call duration and others.

Figure 16:
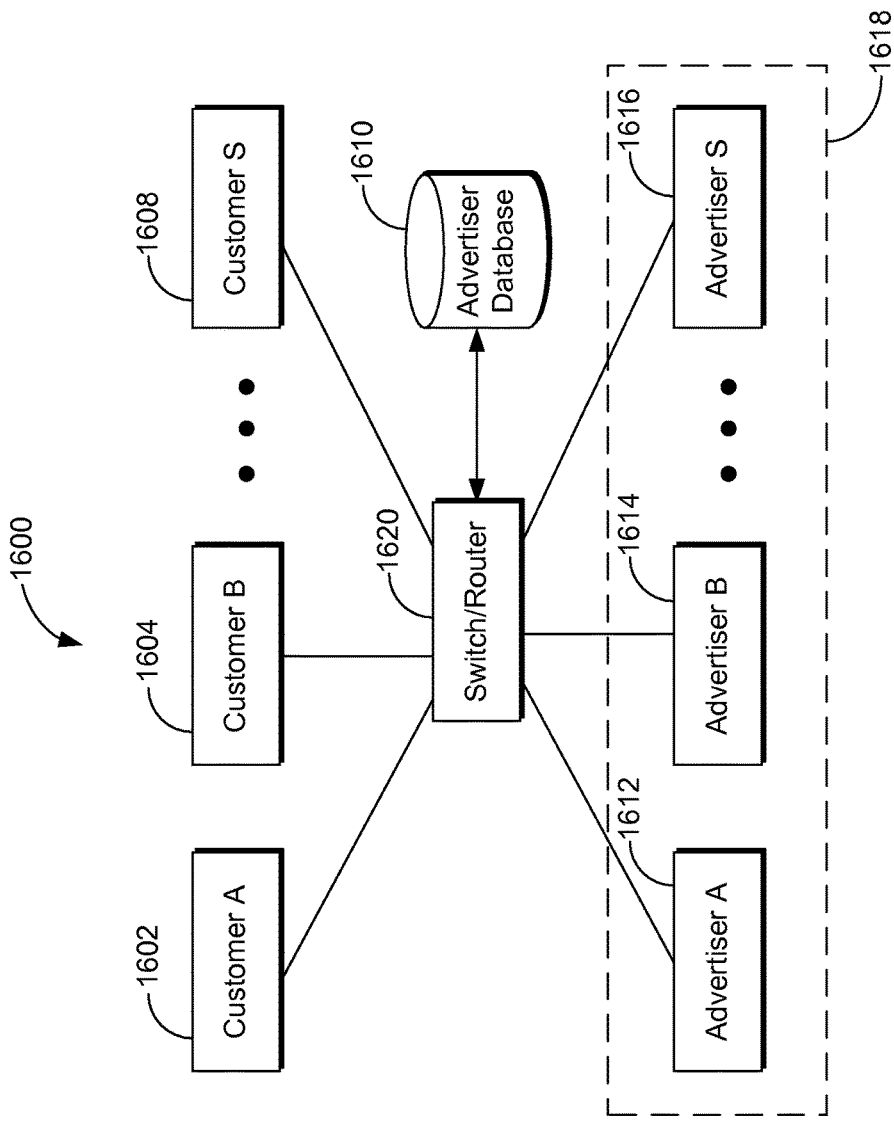
FIG. 16 illustrates a diagram of a system to route customer calls to advertisers.

FIG. 16 illustrates a diagram of a system to route customer calls to advertisers. In one embodiment, a switch/router 1620 is used to dynamically connect customers to advertisers according to the information in the advertiser database 1610. When a user, such as Customer A 1602, Customer B 1604, Customer S 1608 etc., calls a phone number provided in an advertisement, the customer is first connected to the switch/router 1620. With or without further customer input, the switch/router 1620 connects the call to an advertiser, such as advertiser A 1612, advertiser B 1614, advertiser S 1616, etc. The advertiser is charged based on the telephone calls routed to the advertiser. In one embodiment, the selection of the advertiser is made at the switch/router 1620 after the customer phone call is received. The telephone number dialed by the customer is searched in the advertiser database 1610 in order to find a corresponding actual telephone number of the advertiser. As mentioned earlier, the call can be routed through a directory assistance service; and the advertisements can be delivered during the directory assistance service.

Alternatively, information about the customer phone number and the desire to make the phone call according to the advertised phone number can be transmitted to the switch/router 1620 through a communication link other than a phone connection. For example, an email, a fax, an HTTP (HyperText Transfer Protocol)/WAP (Wireless Application Protocol) request, etc., can be used to submit the request for the phone connection. The switch/router 1620 then initiates the phone call to the customer and selects the advertiser for the phone call. In one embodiment, the request is made via a communication protocol such as SIP.

Note that the assigned phone number may also be encoded in a way so that the information about the media channel which provides the phone number to the Customer can be decoded, as discussed above. For example, different media channels may be assigned different phone numbers for reaching the same group of advertisers through the switch/router 1620. According to the phone number in the advertisement, the switch/router 1620 can determine the media channel that is appropriate for the delivery of the phone number to the Customers.

In one embodiment, the availability of the advertisers to answer the call is also considered. In one embodiment, if the top-ranking (e.g., according to the bidding) advertiser receives a call and does not answer after a certain amount of time (e.g. 30 seconds), the call is automatically routed to the second-highest ranking advertiser, and so on. In another embodiment, the missed call is routed to a human concierge who shepherds the call to the appropriate available advertiser or information source.

In one embodiment, the advertiser group includes subgroups of advertisers for different geographic areas. Indications of geographic areas of interest to the callers can be used in the selection process.

In one embodiment, the selection of the geographic area is made when the customer selects the phone number from the advertisements. The phone number is encoded with geographic area information such that, when the phone number is dialed, the geographic area information can be automatically decoded from the phone number dialed; and the geographic area information can be used to rank the advertisers and/or eliminate the advertisers that are not serving the corresponding geographic areas.

In one embodiment, the geographic area information is determined from the location of the customer phone. Alternatively, the customer may specify the geographic area in the phone call to the switch/router 1620, through an automated system or through human concierges. Further, the customer may specify requirements other than geographic areas for selecting the winning advertiser.

Figure 17:
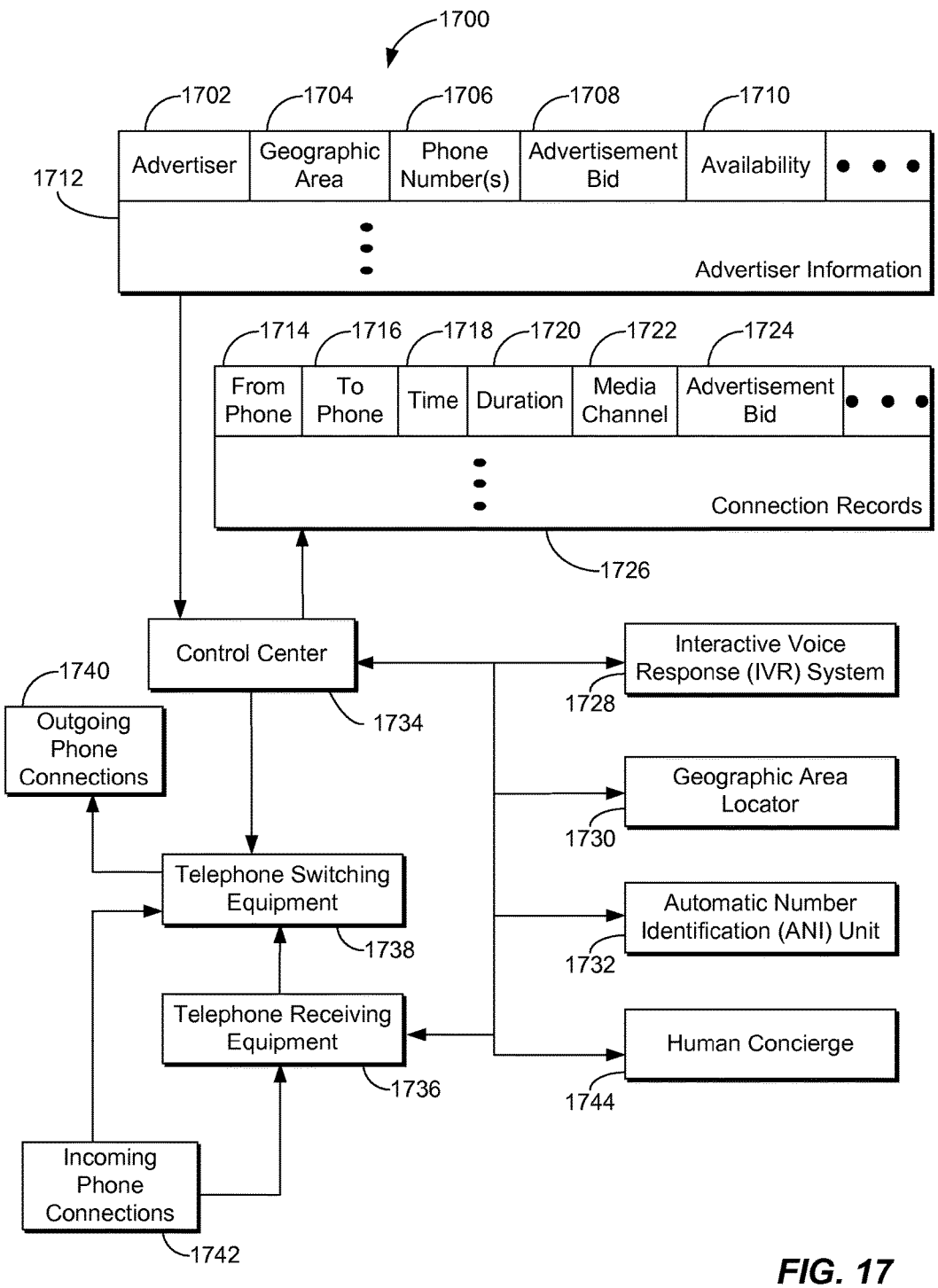
FIG. 17 illustrates a diagram of a telephone connection system.

FIG. 17 illustrates a diagram of a telephone connection system. When a customer calls an advertised telephone number, the phone call is connected to the telephone receiving equipment 1736. The telephone receiving equipment 1736 is connected to the control center 1734 to operate the telephone switching equipment 1738, which selectively connects incoming phone connections 1742 from the customers and outgoing phone connections 1740 to the winning advertisers.

In one embodiment, the telephone receiving equipment 1736 and the telephone switching equipment 1738 are circuit switched, including Private Branch Exchange (PBX) and a dedicated voice network. Alternatively, the telephone receiving equipment 1736 and the telephone switching equipment 1738 may be packet switched, including Internet Protocol (IP) based PBX, or a soft-switch, or SIP Servers and Media Servers, a data communication network and a gateway. In general, various telephonic techniques known in the art can be used.

When the telephone receiving equipment 1736 receives a phone call, the control center 1734 determines whether further information is needed and/or can be obtained from the caller. For example, to determine a geographic area of interest, the control center 1734 can instruct the interactive voice response (IVR) system 1728 to prompt the caller to key in the desired zip code. In one embodiment, Interactive Voice Response (IVR) is a telephony technology in which one may use a touch-tone telephone to interact with a database to acquire information from or enter data into the database without the help of a human concierge. In one embodiment, information may also be collected using Voice Recognition technology to get and interpret spoken choices provided by the users.

Further, the control center may direct the IVR system 1728 to prompt the caller to specify further criteria based on the advertiser information 1712. For example, when the phone number is for a group of mortgage brokers, the customer may be directed to select loan sizes, loan types, etc.

Alternatively, the control center 1734 may instruct the geographic area locator 1730 to determine a geographic area from which the call is initiated. For example, the geographic area locator may use the cellular position system to determine the location of a cellular phone, or use a satellite/pseudolite positioning system to determine the location of a mobile device. Pseudolites are ground-based transmitters signals similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternative, a method known as Advanced Forward Link Trilateration (AFLT), or Enhanced Observed Time Difference (EOTD), can be used, which measures the reception times of cellular signals from several base stations to the cellular phone. Alternatively, the cellular site in which the mobile device can communicate to a based station can be used to determine a rough position of the cellular phone. In general, any method used by a cellular phone provider to get location information (e.g., for emergency service) can be used.

The control center 1734 may also instruct the automatic number identification (ANI) unit 1732 to determine the phone number of the incoming call and look up the geographic area information from the database for the phone numbers.

Alternatively, the control center 1734 may connect the phone call temporally to a human concierge who can help the caller to specify a selection criterion (or criteria).

In one embodiment, the control center 1734 uses a number of different types of information to select the winning advertiser based on the advertiser information 1712.

In one embodiment, the advertiser information 1712 include the identities of the advertisers 1702, the geographic areas 1704 of the advertisers, the phone number(s) 1706 of the advertisers, the placement bids 1708 of the advertisers, the availability statuses 1710 of the advertisers, etc. In an alternative embodiment, more or less fields can be used for the advertiser information.

The availability may include the information about the projected waiting time for a caller to get through. The availability may also depend on the advertisement budget specified by the advertiser. For example, the advertiser may specify the advertisement budget in terms of the maximum number of calls in a day, the minimum time intervals between two calls, working hours, etc.

After the advertiser is determined, the control center 1734 can instruct the telephone switching equipment 1738 to connect the incoming phone call to the phone number of the advertiser. The control center 1734 then creates a record entry in connection records 1724 to indicate the connection made for the advertiser. For example, a record entry may include information such as the from phone number 1714, the to phone number 1716, the time the connection is made 1718, the duration of the connection 1720, the media channel 1722 responsible for delivering the advertisement to the caller, the advertisement bid 1724 of the advertiser at the time of the connection, etc. Other information, such as whether or not a human concierge is involved, can also be recorded. In an alternative embodiment, more or less fields can be used for the connection records.

In one embodiment, the recorded connection information is used to generate an invoice to bill the advertisers. An account of the advertiser may be debited automatically for the connection. Alternatively, a payment for the advertisement is collected automatically through an electronic system for the connection.

In one embodiment, the system 1700 can be utilized in a directory assistance service or information service (e.g., 411) process to redirect customer calls to advertisers once an advertisement has been provided to the customer. In one example, the advertisement information 1712 and connection records 1726 can be part of the computer infrastructure of the directory assistance service. In another example, the advertisement information 1712 and connection records 1726 can be part of the computer infrastructure of the advertisement processing service which provides audio advertisements, text advertisements, image advertisements, or multimedia advertisements to the directory assistance service.

Figure 18:
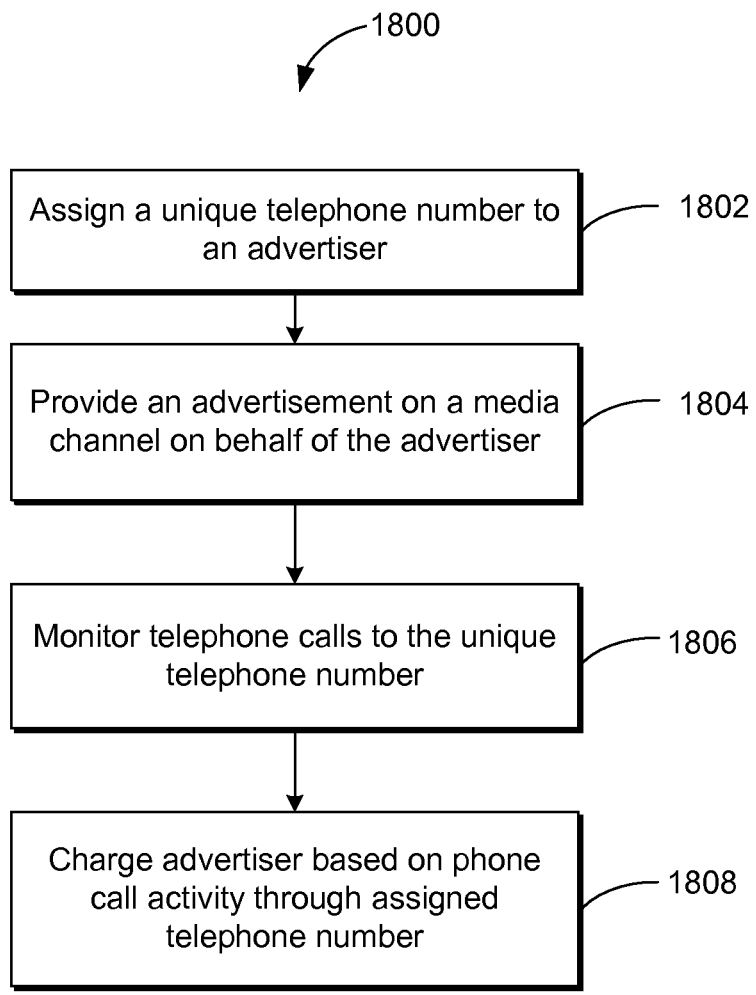
FIG. 18 illustrates a data flow diagram for providing an advertisement to a customer and monitoring the customer response to the advertisement.

FIG. 18 illustrates a data flow chart for providing an advertisement to a customer and monitoring the customer response to the advertisement. At process block 1802, a unique telephone number is assigned to an advertiser 108. The telephone number can be unique with respect to the advertisers and/or the media channels used to deliver the advertisements for the advertisers. In one embodiment, the telephone number can be used to uniquely identify the advertisers (and optionally the media channels) within a period of time. The process 1800 continues to process block 1804.

At process block 1804, an advertisement is provided on a media channel on behalf of the advertiser. The advertisement can include one of the unique telephone numbers assigned to the advertiser and/or, a reference to the unique telephone number. The process 1800 can continue at process block 1806.

At process block 1806, the telephone calls received at the unique telephone number assigned to the advertiser are monitored. Indications of calls received at the unique telephone number assigned to the advertiser are thereby stored for later, or in real-time, charging the advertiser, depending on the number of calls resulting from the advertisement. The process 1800 continues at process block 1808.

At process block 1808, an advertiser is charged based on phone call activity through the assigned telephone number. Therefore, the telephone number that has been assigned to the advertiser 108 can allow tracking the telephone calls that have been made to the advertiser as a result of the advertisement and charging the advertiser based on a price per call. In one embodiment, the advertiser can be charged for each call received, or connected to the advertiser 108, as a result of the advertisement.

Figure 19:
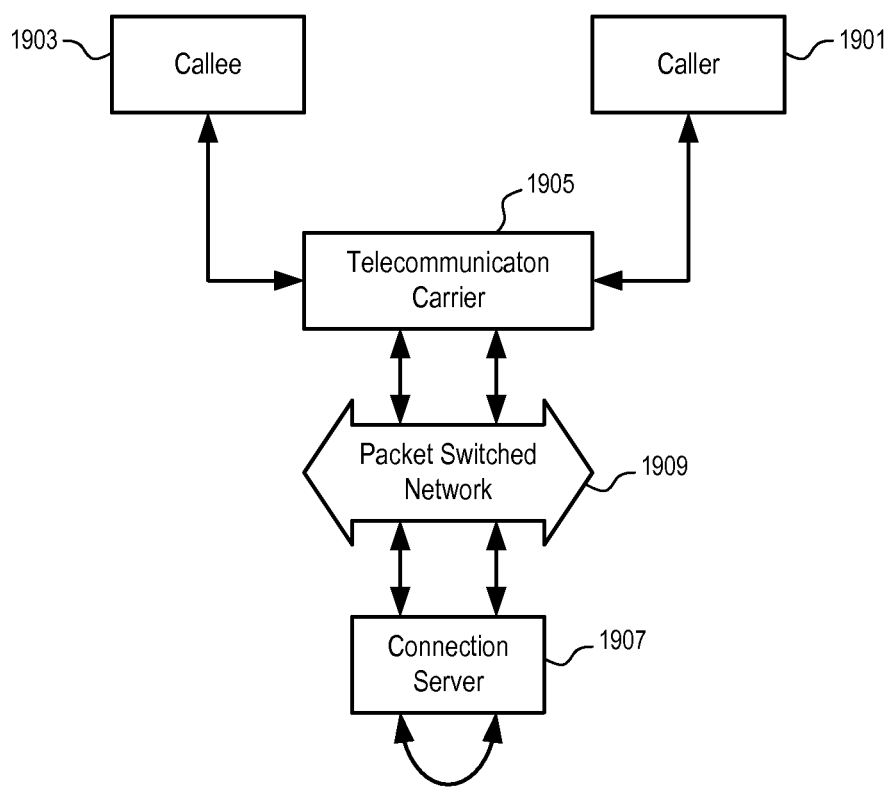
FIG. 19 shows a system including a connection server configured on a packet switched network according to one embodiment.

In one embodiment, a connection provider (or router or call handling module) uses a connection server configured on a packet switched network to provide telephone connections between callers (e.g., customers) and callees (e.g., advertisers), as illustrated in FIG. 19. In FIG. 19, the connection server (1907) receives and/or places telephone calls via the telecommunication carrier (1905) over the packet switched network (1909). The telecommunication carrier (1905) further routes the telephone communications towards the caller (1901) and the callee (1903).

Since the telecommunication carrier (1905) can route a call from a packet switched network to a variety of destinations (e.g., a traditional analog telephone set, a mobile phone, a cellular phone, a WiFi phone, a Bluetooth phone, a softphone running on a computer, etc.), the connection sever (1907) can use one type of communication connection with the telephone carrier (1905) to facilitate the communication connections with variety of devices used by the customers (e.g., callers and callees). Thus, the implementation of the connection server (1907) can be simplified. In one embodiment, the connection server (3307) can also place and/or receive direct VoIP calls to/from the caller (or callee).

For example, to make a voice connection in response to a click-to-call request, the connection server can place separate VoIP calls, via the telecommunication carrier (1905), to the caller (1901) (e.g., the requester of the click-to-call) and the callee (1903) (e.g., the destination of the click-to-call request).

If the caller (1901) (or the callee 1903) is on a public switched telephone network (PSTN), the telecommunication carrier (1905) bridges the packet switched the network and the public switched telephone network (PSTN). The telecommunication carrier (1905) routes the call from the packet switched network (1909) to the caller (1901) (or the callee 1903) on the circuit switched network. Thus, the caller (1901) (or the callee 1903) can use a telephone set to receive the call via a Plain Old Telephone Service (POTS). The connection server (1907) joins the separate calls that are placed via the packet switched network (1909) to connection the callee (1903) and the caller (1901).

In one embodiment, call signaling and media content may use different network paths. While call signaling is arranged to go through the packet switched network (1909) and the connection server (1907), the media stream does not have to go through the connection server (1907). For example, when the calls are joined, the media content may be redirected to flow over the communication carrier (1905) without going through the packet switched network (1909) to the connection server (1907) for improved performance and efficiency. The connection server (1907) can release the control over the media stream to allow the media stream to flow through the shortest path, without going through the connection server, while maintaining control to the connection for the call by staying on the path for call signaling.

In another example, when the caller (1901) initiates a call over a PSTN to the connection server (1907), the telecommunication carrier (1905) converts the call for the packet switched network (1909) for the connection server (1907).

In one embodiment, virtual softphones on the telecommunication carrier (1905) are assigned to the caller (1901) and the callee (1903) for interfacing with the connection server (1907) over the packet switched network (1909). The virtual softphones encapsulates the devices and networks used by the caller (1901) and callee (1903) to access the connection server (1907); and the telecommunication carrier (1905) shields the connection server (1907) from the implementation details of the user devices and networks used by the caller (1901) and the callee (1903). The connection server (1907) calls (or receives calls from) and connects the virtual softphones on the telecommunication carrier (1905) to connect the caller (1901) and the callee (1903).

In FIG. 19, the telephone connection between the telecommunication carrier (1905) and the connection server (1907) is facilitated via a packet switched network (1909). Thus, the connection server (1907) can operate efficiently in a digital domain. The connection server (1907) interfaces with the telecommunication carrier (1905) using one type of Internet Telephony systems (e.g., SIP-based Internet telephony).

Alternatively, a connection server may include some or all of the functionality of the telecommunication carrier (1905). For example, the connection server may be configured to bridge a packet switched network and a circuit switched network. The connection server may support multiple, different types of Internet Telephony systems.

In one embodiment, the connection server (1907) and the telecommunication carrier (1905) are operated by different, separate entities. Alternatively, the connection server (1907) and the telecommunication carrier (1905) may be operated by the same entity. In another embodiment, the telecommunication carrier (1905) includes a set of facilities operated by a number of separate entities.

In one embodiment, the caller (1901) and/or the callee (1903) may also place/receive calls via a packet switched network. The telecommunication carrier (1905) may route the calls between the caller (1901) and the callee (1903) without using a PSTN. In one embodiment, caller (1901) and/or the callee (1903) may place calls to or receive calls from the connection server (1907) via Internet.

Figure 20:
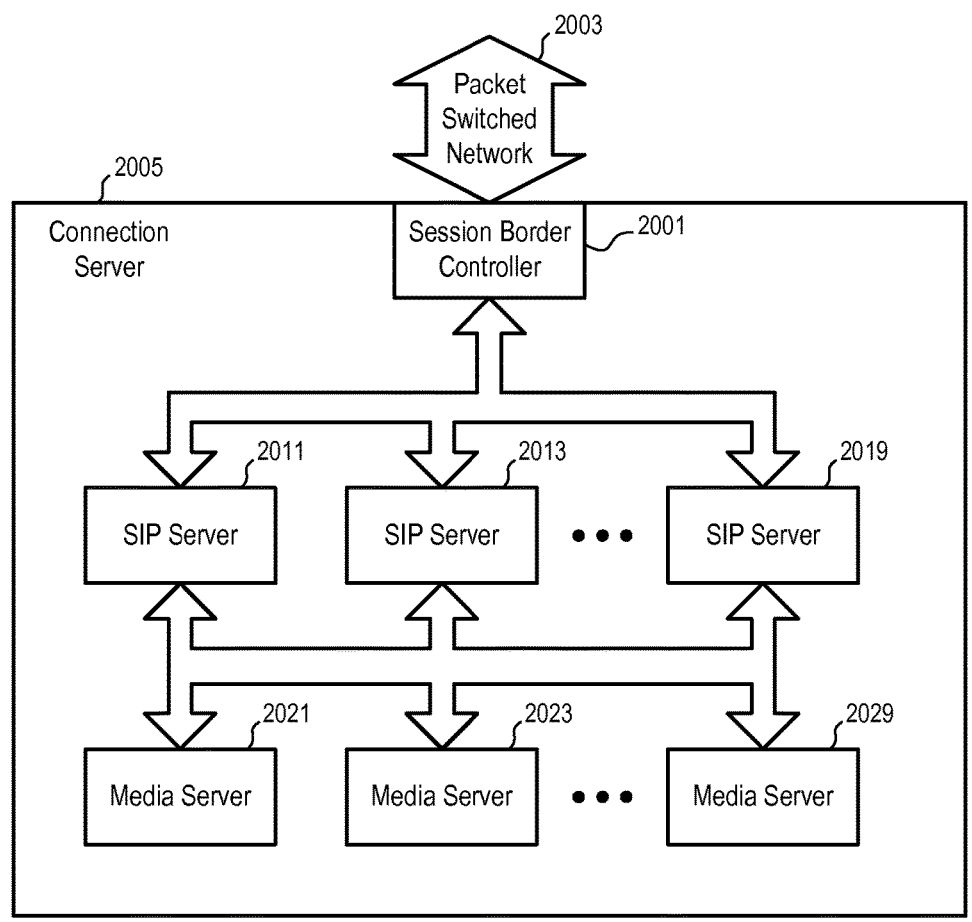
FIG. 20 shows a connection server according to one embodiment.

FIG. 20 shows a connection server according to one embodiment. In FIG. 20, the connection server (1906) is configured to place and/or receive VoIP calls using Session Initiation Protocol (SIP). A session border controller (2001) is used to interface with the packet switched network (2003) and control the types of network traffic related to VoIP calls that might go into the connection server (2005).

In one embodiment, the session border controller (1906) is configured to control the signaling and media stream during the setting up, conducting and tearing down of VoIP calls to or from the connection server (2005). In some embodiments, the session border controller (1906) may pick up the call that comes to the session border controller (1906), places a separate call from the session border controller (1906), and joins the received call and the placed call to control both the signaling and media stream. In some embodiments, the session border controller (1906) may perform signaling/encoding translation to allow the connection server (2005) to process the VoIP calls in one standard, while receiving VoIP calls in a variety of standards (e.g., SIP, H.323, etc.). In one embodiment, the session border controller (1906) is configured to perform one or more firewall functionalities, such as denial of service protection, call filtering, bandwidth management, etc.

In one embodiment, the session border controller (1906) is configured to perform media releasing operation. When the session border controller (1906) determines that the source and destination of a media stream is on the same side of the session border controller (1906) (e.g., both the source and the destination of the media stream is outside the connection server 2005), the session border controller (1906) can release the hairpining of the media stream and allow the media stream to flow without going through the session border controller (1906).

In FIG. 20, a set of SIP servers (e.g., 2011, 2013, . . . , 2019) are networked to the session border controller (2001) to receive messages for incoming calls and to initiate outgoing calls. The session border controller (2001) is configured to evenly distribute the calls for processing by the SIP servers.

For example, when an incoming message for the initiation of a call is received (e.g., a SIP INVITE message from the telecommunication carrier 1905), the session border controller (2001) may route it to a SIP server (e.g., 2011) for processing. The INVITE message includes the phone number dialed by the caller and the contact information about the caller (e.g., the phone number of the caller 1901 and/or the identity of the virtual SIP phone at the telecommunication carrier 1905).

The SIP server may determine whether the phone number dialed by the caller (1903) is sufficient to determine the phone number of the callee (e.g., 1903). If the phone number of the callee (e.g., 1903) can be determined from the phone number dialed by the caller (1903) (e.g., via decoding the phone number dialed by the callee, or looking up the phone number of the callee from a table using the phone number dialed by the caller as a key), the SIP server can place a separate SIP call to the callee via the packet switched network (2003) and then connect the caller and the callee. Alternatively, the SIP server can further route the SIP INVITE message (e.g., to the telecommunication carrier (1905) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (2021) (or a virtual softphone on SIP server) as the initiator for a separate call. The SIP server then connects the calls for the media stream.

In one embodiment, the caller is first connected to a media server (e.g., 2021, 2023, or 2029). For example, the SIP server may forward the SIP INVITE message to one or more of the media servers for answering the call. When a media server (e.g., 2021) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (2003) (e.g., by sending a SIP INVITE message to the telecommunication carrier 1905, which further bridges the call to the callee 1903). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (2001) into the connection server (2005). For example, the media stream can go through the telecommunication carrier (1905) in FIG. 19 without going to the connection server (1907) after the SIP server connects the caller and the callee.

However, the SIP server stays on the signaling path to monitor the progress and termination of the call. The SIP server can also break the connection between the caller and the callee, or force the media stream to come through the connection serve (2005). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (2003) for a connection to the caller. The SIP call may be bridged onto a circuit switched network (e.g., by a telecommunication carrier 1905). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (2011, 2013, . . . , 2019) and media servers (2021, 2023, . . . , 2029) are implemented on separate computers connected via a local area network (and/or intranet or Internet). Alternatively, at least the some of the servers can be implemented on a same computer. In one embodiment, the SIP servers and the media servers are also integrated with the session border controller (2001) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (2005) may further include a database server (2005) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

While the apparatus and method have been described in terms of what are presently considered the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of converting visual content information in an image into audio content and providing the audio content for presentation, the method comprising:

transmitting first content by a server system via a network to a first end-user device to facilitate a user interface presented by an application of the first end-user device to prompt input comprising an image;

processing a first transmission received from the first end-user device via a network by the server system, the first transmission (a) comprising an image, the image comprising visual content information and provided as input via the user interface, and (b) corresponding to a request from an advertiser;

responsive to the request from the advertiser, generating, by the server system, audio content based at least in part on the image included in the visual content information at least in part by:

analyzing the visual content information to extract meaningful words from the visual content information;

identifying one or more limits associated with the audio content;

generating a summarized text for the audio content (a) based on the meaningful words extracted from the visual content information, (b) using natural language processing to link the meaningful words based on a heuristic model and a database of words commonly used in similar content, and (c) based at least in part on the one or more limits associated with the audio content, wherein the linking of the meaningful words based on the heuristic model and the database of words commonly used in similar content generates grammatically correct text; and converting the summarized text into speech to generate the audio content and storing the audio content in an audio file;

transmitting by the server system via the network the audio file storing the audio content for presentation via a second end-user device;

processing by the server system a second transmission received consequent to a selection of the audio content, via the second end user device, that initiates a real-time communication connection for a call from the second end user device to the advertiser upon selection of the audio content;

determining by the server system whether the call from the second end user device has been connected to the advertiser via the audio content; and responsive to determining that the call from the second end user device has been connected to the advertiser via the audio content, generating a record entry in a connection record data structure indicating that the call from the second end user device was connected to the advertiser via the audio content.

2. The method of claim 1, wherein determining whether a call from the user has been connected to the advertiser via the audio content comprises:
receiving a call from the user via the audio content;
connecting the call received form the user to the advertiser; and
recording information indicating the connecting of the call received from the user to the advertiser.

3. The method of claim 2, wherein the call is received at a connection provider from a third party over a packet switched network; and
the connecting of the call to the advertiser comprises: the connection provider initiating a voice over internet protocol call to the third party for a call to the advertiser.

4. The method of claim 3, wherein a first virtual softphone at the third party corresponds to the user; a second virtual softphone at the third party corresponds to the advertiser; and the connecting the call to the advertiser further comprises:
directing the first and second virtual softphones to establish a media connection that does not go through the connection provider.

5. The method of claim 1, wherein the visual content information includes text.

6. The method of claim 1, further comprising delivering the audio content during a directory assistance call.

7. The method of claim 6, further comprising determining whether a call from the user has been connected to the advertiser via a directory assistance call; and
crediting a service provider of directory assistance a portion of the predefined fee responsive to a determination that a call from the user has been connected to the advertiser via the audio content presented during the directory assistance call.

8. The method of claim 1 wherein the audio content is transmitted for presentation on behalf of the advertiser in accordance with a callable time window associated with the advertiser.

9. A server system for converting visual content information in an image into audio content and providing the audio content for presentation, the server system comprising:
one or more network interfaces configured to provide access to a network;
one or more servers, coupled to the one or more network interfaces, the one or more servers to execute instructions to:
transmit first content via the network to a first end-user device to facilitate a user interface presented by an application of the first end-user device to prompt input comprising an image;
process a first transmission received from the first end-user device via a network by the server system, the first transmission (a) comprising an image, the image comprising visual content information and provided as input via the user interface, and (b) corresponding to a request from an advertiser;
responsive to the request from the advertiser, generate, audio content based at least in part on the image included in the visual content information at least in party by:
analyzing the visual content information to extract meaningful words from the visual content information;
identifying one or more limits associated with the audio content;
generating a summarized text for the audio content (a) based on the meaningful words extracted from the visual content information, (b) using natural language processing to link the meaningful words based on a heuristic model and a database of words commonly used in similar content, and (c) based at least in part on the one or more limits associated with the audio content, wherein the linking of the meaningful words based on the heuristic model and the database of words commonly used in similar content generates grammatically correct text; and
converting the summarized text into speech to generate the audio content and storing the audio content in an audio file;
transmit via the network, the audio file storing the audio content for presentation via a second end-user device; and
process a second transmission received consequent to a selection of the audio content, via the second end user device, that initiates a real-time communication connection for a call from the second end user device to the advertiser upon selection of the audio content;
determine whether the call from the second end user device has been connected to the advertiser via the audio content; and
responsive to determining that the call from the second end user device has been connected to the advertiser via the audio content, generating a record entry in a connection record data structure indicating that the call from the second end user device was connected to the advertiser via the audio content; and
one or more storage media coupled to the one or more servers to retain the instructions.

10. The server system of claim 9, wherein the one or more servers are further configured to execute instructions to:
receive a call from the user via the audio content,
connect the call received from the user to the advertiser, and
record information regarding the connecting of the call received from the user to the advertiser.

11. The server system of claim 9, wherein the one or more servers are further configured to execute instructions to provide the audio content during a directory assistance call.

12. The server system of claim 9 wherein the audio content is transmitted for presentation on behalf of the advertiser in accordance with a callable time window associated with the advertiser.

* * * * *